US008954996B2

(12) United States Patent
Carvalho de Melo et al.

(10) Patent No.: US 8,954,996 B2
(45) Date of Patent: Feb. 10, 2015

(54) PROFILING THE SYSTEM PROVIDING PERFORMANCE STATISTICS IN REAL TIME

(75) Inventors: Arnaldo Carvalho de Melo, Paraná (BR); Ingo Molnar, Kagel (DE); Thomas Gleixner, Uhldingen (DE)

(73) Assignee: Red Hat, Inc., Raleigh, NC (US)

( * ) Notice: Subject to any disclaimer, the term of this patent is extended or adjusted under 35 U.S.C. 154(b) by 753 days.

(21) Appl. No.: 12/636,670

(22) Filed: Dec. 11, 2009

(65) Prior Publication Data
US 2011/0145838 A1 Jun. 16, 2011

(51) Int. Cl.
  G06F 9/44 (2006.01)
  G06F 3/00 (2006.01)
  G06F 9/46 (2006.01)
  G06F 13/00 (2006.01)
  G06F 11/32 (2006.01)
  G06F 11/34 (2006.01)

(52) U.S. Cl.
  CPC .......... *G06F 11/323* (2013.01); *G06F 11/3466* (2013.01); *G06F 11/3409* (2013.01); *G06F 2201/865* (2013.01); *G06F 2201/88* (2013.01)
  USPC ............................ 719/318; 717/127; 717/131

(58) Field of Classification Search
  None
  See application file for complete search history.

(56) References Cited

U.S. PATENT DOCUMENTS

| | | | |
|---|---|---|---|
| 5,485,574 A | 1/1996 | Bolosky et al. | |
| 5,872,976 A | 2/1999 | Yee et al. | |
| 6,098,169 A | 8/2000 | Ranganathan | |
| 6,163,856 A | 12/2000 | Dion et al. | |
| 6,167,538 A * | 12/2000 | Neufeld et al. | 714/47.2 |
| 6,341,357 B1 | 1/2002 | Ravichandran | |
| 6,374,369 B1 | 4/2002 | O'Donnell | |
| 6,438,512 B1 | 8/2002 | Miller | |
| 6,625,648 B1 | 9/2003 | Schwaller et al. | |
| 6,658,654 B1 | 12/2003 | Berry et al. | |
| 6,671,876 B1 | 12/2003 | Podowski | |
| 6,766,471 B2 | 7/2004 | Meth | |
| 6,792,392 B1 * | 9/2004 | Knight | 702/186 |
| 6,801,940 B1 | 10/2004 | Moran et al. | |
| 6,874,099 B1 | 3/2005 | Balasubramanian et al. | |
| 6,901,582 B1 | 5/2005 | Harrison | |
| 6,981,135 B1 | 12/2005 | Trask | |
| 7,003,698 B2 | 2/2006 | Glass | |
| 7,020,758 B2 | 3/2006 | Fisk | |
| 7,051,098 B2 * | 5/2006 | Masters et al. | 709/224 |
| 7,076,547 B1 | 7/2006 | Black | |
| 7,089,403 B2 | 8/2006 | Pechtchanski et al. | |
| 7,117,501 B2 | 10/2006 | Rosu et al. | |
| 7,228,527 B1 | 6/2007 | Phillips et al. | |

(Continued)

OTHER PUBLICATIONS

Corbet, Jonathan, "Dueling Performance Monitors," LWN.net, Dec. 9, 2008, http://lwn.net/Articles/310260/, 4 pages.

(Continued)

*Primary Examiner* — Emerson Puente
*Assistant Examiner* — Jonathan R Labud
(74) *Attorney, Agent, or Firm* — Lowenstein Sandler LLP

(57) ABSTRACT

A system for providing performance statistics of applications in real time includes a first application that obtains current performance data of at least one second application in real time, utilizes the current performance data to determine a list of functions and the number of events occurred during the execution of each function, presents the resulting data to a user, and periodically refreshes the presented data using up-to-date performance data of the second application.

23 Claims, 16 Drawing Sheets

(56) References Cited

U.S. PATENT DOCUMENTS

| | | | |
|---|---|---|---|
| 7,457,722 B1 | 11/2008 | Shain et al. | |
| 7,890,620 B2 | 2/2011 | Masuda et al. | |
| 8,171,340 B2 | 5/2012 | Molnar | |
| 8,286,192 B2 | 10/2012 | Molnar | |
| 2004/0054850 A1 | 3/2004 | Fisk | |
| 2004/0064552 A1* | 4/2004 | Chong et al. | 709/224 |
| 2004/0103221 A1 | 5/2004 | Rosu et al. | |
| 2005/0033766 A1 | 2/2005 | Pang et al. | |
| 2005/0210454 A1* | 9/2005 | DeWitt et al. | 717/133 |
| 2006/0041794 A1 | 2/2006 | Aaron | |
| 2006/0206287 A1* | 9/2006 | Rosam et al. | 702/182 |
| 2007/0006032 A1 | 1/2007 | Sun | |
| 2008/0046725 A1 | 2/2008 | Lo et al. | |
| 2008/0126828 A1* | 5/2008 | Girouard et al. | 714/2 |
| 2008/0134170 A1 | 6/2008 | Astheimer | |
| 2008/0320109 A1 | 12/2008 | Andrews et al. | |
| 2009/0070462 A1 | 3/2009 | Chong et al. | |
| 2009/0217092 A1 | 8/2009 | Weiberle et al. | |
| 2011/0138146 A1 | 6/2011 | Molnar | |
| 2011/0138389 A1 | 6/2011 | Molnar | |
| 2011/0145829 A1 | 6/2011 | Molnar | |

OTHER PUBLICATIONS

Corbet, Jonathan, "Followups: Performance Counters, ksplice, and fsnotify," LWN.net, http://lwn.net/Articles/311850/, Dec. 17, 2008, 5 pages.

Gleixner, Thomas, "[Announcement] Performance Counters for Linux," LWN.net, http://lwn.net/Articles/310176/, Dec. 4, 2008, 4 pages.

Gleixner, Thomas, "[Patch 2/3] Performance Counters: Documentation," LWN.net, http://lwn.net/Articles/310269/, Dec. 4, 2008, 3 pages.

Molnar, Ingo, "Re: [Patch0/3] [Announcement] Performance Counters for Linux," LWN.net, http://lwn.net/Articles/310274/, Dec. 5, 2008, 2 pages.

Molnar, Ingo, "Performance Counters for Linux, V2," LWN.net, http://lwn.net/Articles/310150/, Dec. 8, 2008, 27 pages.

Molnar, Ingo, "Performance Counters for Linux, V3," LWN.net, http://lwn.net/Articles/310888/, Dec. 11, 2008, 33 pages.

Molnar, Ingo, "Performance Counters for Linux, V4," LWN.net, http://lwn.net/Articles/311388/, Dec. 14, 2008, 38 pages.

Office Action mailed Apr. 4, 2012 for U.S. Appl. No. 12/636,674.
Office Action mailed Jul. 24, 2012 for U.S. Appl. No. 12/636,674.
Office Action mailed Mar. 3, 2011 for U.S. Appl. No. 12/636,661.
Office Action mailed Aug. 3, 2011 for U.S. Appl. No. 12/636,661.
Notice of Allowance mailed Dec. 27, 2011 for U.S. Appl. No. 12/636,661.
Office Action mailed Mar. 13, 2012 for U.S. Appl. No. 12/631,679.
Office Action mailed Jul. 24, 2012 for U.S. Appl. No. 12/631,679.
Notice of Allowance mailed Jun. 7, 2012 for U.S. Appl. No. 12/631,663.
Notice of Allowance mailed May 16, 2014 for U.S. Appl. No. 12/636,674.
Office Action mailed Sep. 18, 2013 for U.S. Appl. No. 12/631,679.
Office Action mailed Feb. 21, 2014 for U.S. Appl. No. 12/631,679.

* cited by examiner

PROFILING THE SYSTEM PROVIDING PERFORMANCE STATISTICS IN REAL TIME

RELATED APPLICATION

The present application is related to co-filed U.S. patent application Ser. No. 12/631,663, entitled "Kernel Subsystem For Handling Performance Counters and Events", U.S. patent application Ser. No. 12/631,679, entitled "Obtaining Application Performance Data for Different Performance Events via a Unified Channel", U.S. patent application Ser. No. 12/636,661, entitled "Software Performance Counters" and U.S. patent application Ser. No. 12/636,674, entitled "Performance Counter Inheritance", which are assigned to the assignee of the present application.

TECHNICAL FIELD

Embodiments of the present invention relate to measuring performance of applications. Specifically, embodiments of the invention relate to a method and system for providing performance statistics of applications in real time.

BACKGROUND

Collecting performance-related information during the execution of programs has become an important part of program code optimization. Hardware level monitoring collects information at the micro-architectural level such as the number of instructions executed, the number of cache misses, the number of mis-predicted branches, etc.

Contemporary processors typically include a Performance Monitoring Unit (PMU) that provides support for collecting the above information by exporting a set of programmable counters. However, the PMU can change significantly from one processor implementation to another and sometimes inside the same processor family. For example, in the Itanium® Processor Family, the number of events that can be measured goes from about 200 for Itanium® to about 500 for Itanium® 2. Events with the same name are not necessarily encoded the same way. The width of the counters goes from 32 bits to 47 bits between the two generations of processor. In addition, the functionality of each PMU model may vary greatly. Many PMU models go beyond just providing simple counters, many can capture addresses, latencies and branches for example. Similarly, monitoring tools have very different needs depending on what they measure, from collecting simple system-wide counts to collecting counts for individual tasks across multiple processors. Typically, a monitoring tool can receive desired performance data if it provides a specific ("raw") event code for the PMU of the given target CPU.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for providing performance statistics of applications in real time are described herein. In one embodiment, a monitoring application issues a request for performance statistics of one or more monitored applications to the operating system. The request indicates one or more events to be monitored during the execution of the monitored applications. Then, at predefined time intervals, the monitoring application obtains performance information of the monitored applications in real time. Based on the performance information, the monitoring application determines what functions of the monitored applications have been performed when an event took place and the number of events occurred with respect to each function. Further, the monitoring application presents the resulting data to a user, and periodically refreshes the presented data using up-to-date performance information of the monitored applications to allow the user to observe performance of the monitored applications in real time.

In one embodiment, the user can view the presented list of functions and associated counters and can request details for a specific function from the list. In response, the monitoring application displays the details for the specific function and periodically refreshes it to allow the user to view changes to detailed information of the specific function in real time.

Figure 1A:
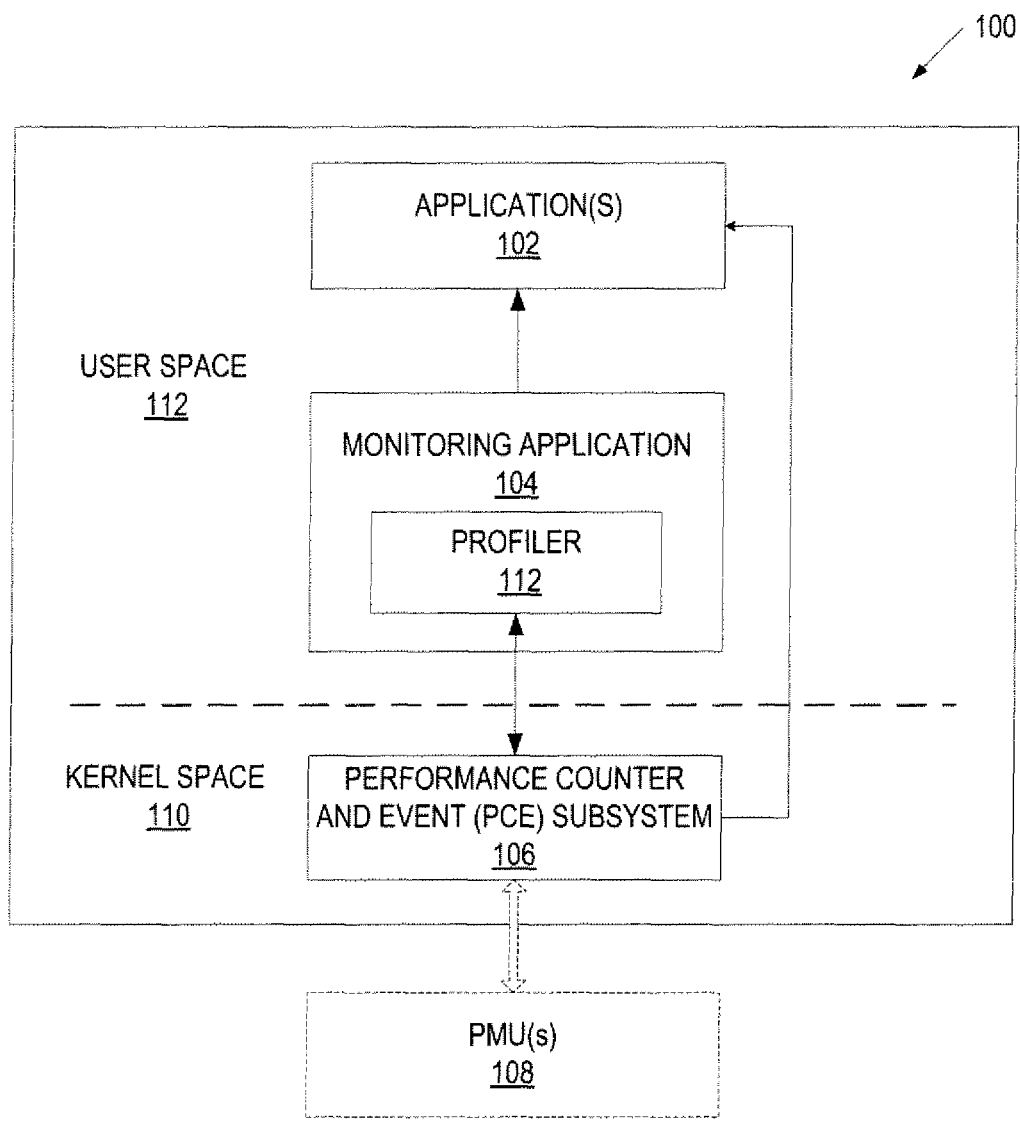
FIG. 1A is a block diagram of one embodiment of a performance monitoring system.

FIG. 1A is a block diagram of one embodiment of a performance monitoring system 100 that may be part of a computing system such as a client computer (e.g., a personal computer, a laptop, a PDA, a mobile phone, etc.), a server computer, and a gateway computer. System 100 includes a physical memory and one or more processors (CPUs). The physical memory is mapped to virtual memory that is divided into user space 112 and kernel space 110. The kernel space 110 is reserved for running an operating system (e.g., Linux® OS, Windows® OS, etc.). The user space 112 is reserved for user mode applications including application(s) 102 and application 104. Application 102 can represent one or more applications of any type including, for example, a browser application, web application, a desktop application, etc. Application 104 monitors performance of application(s) 102 by collecting performance characteristics of the application(s) 102, generating appropriate reports and/or displaying profile information.

Each CPU of the system 100 may have a Performance Monitoring Unit (PMU) 108 that exports a set of programmable hardware counters that collect performance-related data such as the number of instructions executed, the number of cache references, the number of cache misses, the number of branch instructions, the number of mis-predicted branches, the number of CPU cycles, the number of bus cycles, etc. These registers can also trigger interrupts when a threshold number of events have passed, and can thus be used to profile the code that runs on that CPU. Depending on the type of CPU, the PMU may export simultaneously a limited number (e.g., 2, 3 or 4) of hardware counters.

Alternatively, the CPUs of the system 100 may not have a PMU, and the above performance-related data may be collected via software mechanisms provided by the operating system. Yet alternatively, each CPU of the system 100 does have a PMU 108 to provide all or part of the above performance-related data, and in addition the operating system includes software mechanisms to provide the remaining part of the above performance-related data and/or other performance related data for events such as CPU clocks, task clocks, page faults, context switches, CPU migration, fault alignments, fault emulations, etc. Events monitored by hardware mechanisms such as a PMU are referred to herein as hardware events, and events monitored by software mechanisms are referred to herein as software events.

The operating system includes a performance counter and event (PCE) subsystem 106 that provides performance statistics for software events. In addition, in some embodiments, the PCE subsystem 106 provides performance statistics for hardware events as well. The PCE subsystem 106 provides performance statistics upon receiving a request from the monitoring application 104. The monitoring application 104 does not need to be aware of whether the event to be monitored is a software or hardware event. In particular, in one embodiment, the monitoring application 104 only needs to identify the type of event to be monitored (e.g., cache accesses, cache misses, branch instructions, mis-predicted branches, CPU cycles, CPU clocks, task clocks, page faults, context switches, CPU migration, fault alignments, fault emulations, etc.), and the PCE subsystem 106 performs appropriate operations to trigger a respective hardware or software monitoring mechanism and activate a counter corresponding to the identified event type.

In some embodiments, if the monitoring application 104 requests a hardware event that is not supported by system 100, the monitoring application 104 can fallback to an equivalent software event. For example, a computer system may not have a hardware mechanism to measure the CPU cycle event but may have a software mechanism to measure this event. In such a system, if the monitoring application 104 sends a request for a hardware counter of CPU cycles, it will receive an error message from the PCE subsystem 106 indicating that a hardware counter of this event is not supported, and can then change the request to ask for a software counter of this event.

In some embodiments, the PCE subsystem 106 allows the monitoring application 104 to request counters specific to a certain task and/or a particular CPU, keeps track of task switching and/or task migration from one CPU to another during the execution of the application 102, and provides resulting counters to the monitoring application 104. In one embodiment, the PCE subsystem 106 provides performance counter inheritance for task statistics that extends performance counters to cover the execution of each child task as well as the task itself, following them to different CPUs when appropriate. This monitoring is done automatically and transparently, without stopping or in most cases impacting in any observable way the parent task or any child task. The performance counter inheritance can also be used to monitor a hierarchy of tasks, extending this monitoring to all children tasks as well.

In one embodiment, the monitoring application 104 interacts with the PCE subsystem 106 and requests a counter for a hardware or software event type via a single system call that includes the event type as a parameter. This system call returns a file descriptor corresponding to the counter. The monitoring application 104 can then use the file descriptor to perform virtual file system (VFS) system calls such as a read system call to obtain the current value of the counter. The initial system call can include an event time period as a parameter to block reads until the counter overflows the given value, allowing, for example, events to be queried in batches of 1000. In some embodiments, multiple counters are kept open at a time and the counters can be accessed using VFS system calls such as select( ), read( ), epoll( ) or any similar calls.

In one embodiment, the monitoring application 104 includes a task parameter in the initial system call to obtain a counter value for a specific task. In addition, or alternatively, the monitoring application 104 can include a CPU parameter in the initial system call to restrict monitoring to a specific processor.

By utilizing file descriptors and VFS functionality, interactions between the monitoring application 104 and the PCE subsystem 106 are significantly simplified, and the use of ptrace or similar techniques is avoided, thus reducing the amount of privilege needed by the monitoring application 104 and avoiding perturbing the monitored task by stopping and restarting it.

In one embodiment, the monitoring application 104 includes a profiler 112 that can request (e.g., via the above system call) the PCE subsystem 106 to "sample" the performance of the application 102 over a sampling time period with respect to one or more hardware and/or software events. In response to this request, the PCE subsystem 106 periodically (e.g., every 10 milliseconds) records current performance data associated with the specified event(s) to a buffer. The profiler 112 uses a file descriptor associated with the buffer to continually obtain data from the buffer. The profiler 112 creates a profile output using the obtained data and displays it on a screen. The profiler 112 then frequently refreshes the screen with up-to-date information to allow the user to monitor performance statistics in real time.

Figure 1B:
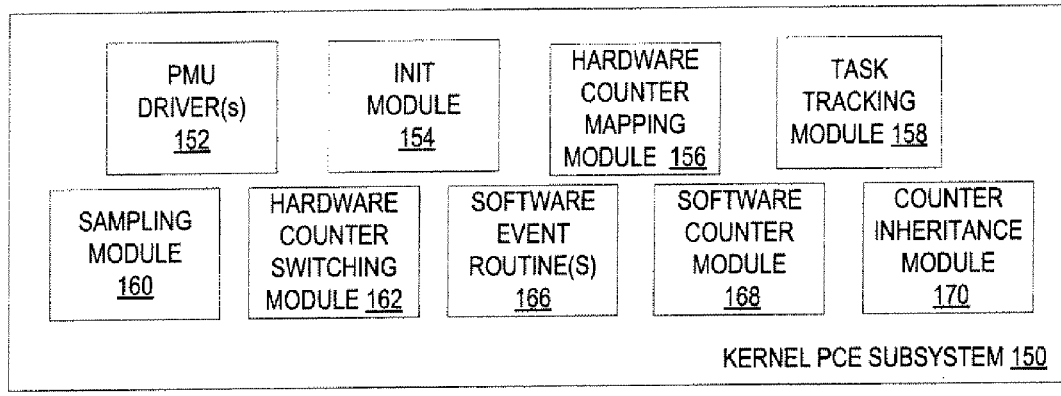
FIG. 1B is a block diagram illustrating a kernel performance counter and event (PCE) subsystem according to some embodiments of the invention.

FIG. 1B is a block diagram illustrating a kernel PCE subsystem 150. The PCE subsystem 150 may include PMU driver(s) 152, an init module 154, a hardware counter mapping module 156, a task tracking module 156, a sampling module 160, a hardware counter switching module 162, software event routine(s) 166, a software counter module 168, and a counter inheritance module 170.

The init module 154 operates during initialization of the operating system. In particular, the init module 154 determines for each processor whether the processor has a PMU, determines the type of the processor, and installs a PMU driver 152 corresponding to the type of the processor. PMU driver 152 provides an interface for the PMU including function calls to activate and deactivate hardware counters for various event types, function calls to setup a sampling register to collect sampling data for the application being monitored, function calls to activate an interrupt flag to raise special interrupts to enable periodic collection of sampling data, etc. The code for function calls in the PMU driver 152 is created based on documentation provided for a specific PMU and other sources such as experimentation results, etc.

The hardware counter mapping module 156 is invoked when the PCE subsystem 200 receives a request of the monitoring application for a hardware event type via a designated system call. The hardware counter mapping module 156 invokes the PMU driver 152 to activate a hardware counter pertaining to the requested hardware event type, creates a file descriptor corresponding to the hardware counter and returns the file descriptor to the monitoring application. In one embodiment, if the system call asks for hardware counters on each processor, the hardware counter mapping module 156 invokes relevant PMU drivers to activate hardware counters on all processors, and creates a file descriptor for each hardware counter. When the monitoring application issues a read system call specifying a file descriptor, the hardware counter mapping module 156 identifies a hardware counter corresponding to the file descriptor, and returns the value of the hardware counter to the monitoring application.

Alternatively, if the monitoring application requests a hardware counter for all processors, the hardware counter mapping module 156 invokes relevant PMU drivers to activate hardware counters on all processors, allocates a data field for a cumulative counter, and creates a file descriptor for the cumulative counter. When the monitoring application issues a read system call specifying this file descriptor, the hardware counter mapping module 156 returns a cumulative value of the hardware counters on all processors to the monitoring application.

If the monitoring application requests a hardware counter for a specific task, the hardware counter mapping module 156 invokes the task tracking module 156 that interacts with a task scheduler of the kernel. Based on notifications of the task scheduler, the task tracking module 158 can determine when the execution of a task begins and when the execution of the task ends, and the hardware counter mapping module 156 can activate and deactivate a corresponding hardware counter accordingly. In addition, the task tracking module 158 may interact with a CPU scheduler of the kernel to detect the CPU switching from one task to another. The hardware counter mapping module 156 can activate a hardware counter when the CPU starts executing a first task, deactivate this hardware counter when the CPU switches to a second task, and then activate this hardware counter again when the CPU switches back to the first task.

The sampling module 160 provides sampling information when the monitoring program requests sampling. Sampling allows the periodic receipt of current program state while one or more applications or tasks are running. The current program state may include an instruction pointer (IP) value that specifies the address of where the application is executing at that specific moment. The monitoring application may request sampling by indicating one or more hardware and/or software events and specifying a sampling time period in the initial system call. In response, the sampling module 160 activates relevant hardware and/or software mechanism(s) for the requested event(s), allocates a buffer to store sampling information, creates a file descriptor corresponding to the buffer and returns the file descriptor to the monitoring application. Exemplary hardware and software mechanisms for handling sampling will discussed in more detail below with reference to FIGS. 7A and 7B. Periodically (e.g., every 10 milliseconds), the sampling module 160 stores sampling information obtained via the relevant hardware and/or software mechanism to the buffer associated with the file descriptor. The monitoring application can obtain the contents of the buffer via a file descriptor read system call or the mmap system call.

The hardware counter switching module 162 is invoked when the number of counters requested by the monitoring application exceeds the number of hardware counters available in the PMU. The hardware counter switching module 162 sets a counter scheduler to trigger a timer interrupt at predefined time intervals. Initially, the available hardware counters perform measurements for a first set of requested events, then upon a timer interrupt, the available hardware counters are switched to perform measurements for a second set of requested events, and so on.

The software counter module 168 is invoked when the PCE subsystem 200 receives a request of the monitoring application for a software event type via a designated system call. The software counter module 168 activates a counter for the requested software event type and invokes a software event routine 166 to monitor the occurrence of the requested software event type and increment the counter. Depending on the operating system, various mechanisms may be used to measure such events as CPU clocks, task clocks, page faults, context switches, CPU migration, fault alignments, fault emulations, etc. A software event routine 166 may be in the form of a driver, a module, a submodule, or any other component of the kernel.

The software counter module 168 also creates a file descriptor corresponding to the software counter and returns the file descriptor to the monitoring application. In one embodiment, if the system call asks for a counter for each processor, the software counter module 168 sets a counter for each processor to measure the event separately on different processors, and creates a file descriptor for each software counter. When the monitoring application issues a read system call specifying a file descriptor, the software counter module 168 identifies a software counter corresponding to the file descriptor, and returns the value of the software counter to the monitoring application.

Alternatively, if the monitoring application requests a software counter for all processors, the software counter module 168 activates a single counter and causes this counter to be used when monitoring performance of the monitored application(s) on all processors.

If the monitoring application requests a software counter for a specific task, the software counter module 168 invokes the task tracking module 156 that interacts with a task scheduler of the kernel. Based on notifications of the task scheduler, the task tracking module 158 can determine when the execution of a task begins and when the execution of the task ends, and the software counter module 168 can activate and deactivate a corresponding software counter accordingly. In addition, the task tracking module 158 may interact with a CPU scheduler of the kernel to detect the CPU switching from one task to another. The software counter module 168 can activate a software counter when the CPU starts executing a first task, deactivate this counter when the CPU switches to a second task, and then activate this counter again when the CPU switches back to the first task.

The counter inheritance module 170 provides performance counter inheritance to extend performance counters to cover the execution of each child task as well as the task itself, following them to different CPUs when appropriate. This monitoring is done automatically and transparently, without stopping or in many cases impacting in an observable way the parent task or any child task. The performance counter inheritance can also be used to monitor a hierarchy of tasks, extending this monitoring to all children tasks as well.

It should be noted that the illustrated elements of the PCE subsystem 150 represent logical components of the PCE subsystem 150 and may or may not be independent modules or sub-modules. In fact, the PCE subsystem 150 may have more or less components than those illustrated in FIG. 1B.

Figure 1C:
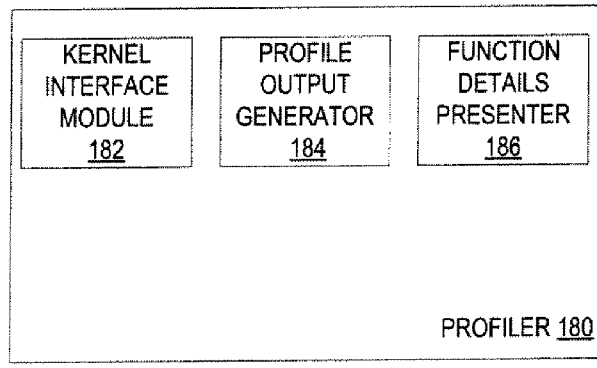
FIG. 1C is a block diagram illustrating one embodiment of a profiler.

FIG. 1C is a block diagram illustrating one embodiment of a profiler 180. The profiler 180 may be part of monitoring application 104 or another application, or it may be an independent application. The profiler 180 may include a kernel interface module 182, a profile output generator 182 and a function detail presenter 186.

The kernel interface module 182 interacts with the PCE subsystem to request sampling of application performance with respect to one or more hardware and/or software events. The request may pertain to applications currently running on the system or to a specific application or task. The kernel interface module 182 may request sampling via a system call that indicates one or more events as a default parameter or explicit parameter. This system call returns a file descriptor corresponding to a buffer to which the PCE subsystem stores current sampling information. The kernel interface module 112 uses the file descriptor to obtain the sampling information. The initial system call can include a sampling interval as a parameter to request that the PCE subsystem record sampling information at specified sampling intervals. The initial system call can include a task parameter to monitor performance data of a specific task, and a CPU parameter to restrict monitoring to a specific processor. The initial system call can also include an inherit parameter to extend monitoring to all children of the measured task(s).

The profile output generator 184 reads current sampling information from the buffer, and determines, based on the sampling information, what functions of the monitored application(s) have been performed when an event took place and the number of events occurred with respect to each function. The profile output generator 184 then presents the resulting data to a user, and periodically refreshes the presented data using up-to-date sampling information of the monitored applications to allow the user to observe performance of the monitored applications in real time. The presented data may include a list functions that were executed when the measured event took place, and the number of events occurred during the execution of each function.

The function details presenter 186 allows the user to request details for a specific function selected from the list of functions. In response to such a user request, the function details presenter 186 displays the details for the specific function and periodically refreshes it to allow the user to observe performance characteristics of the specific function in real time.

It should be noted that the illustrated elements of the profiler 180 represent logical components and may or may not be independent modules or sub-modules. In fact, the profiler 180 may have more or less components than those illustrated in FIG. 1C.

Figure 2:
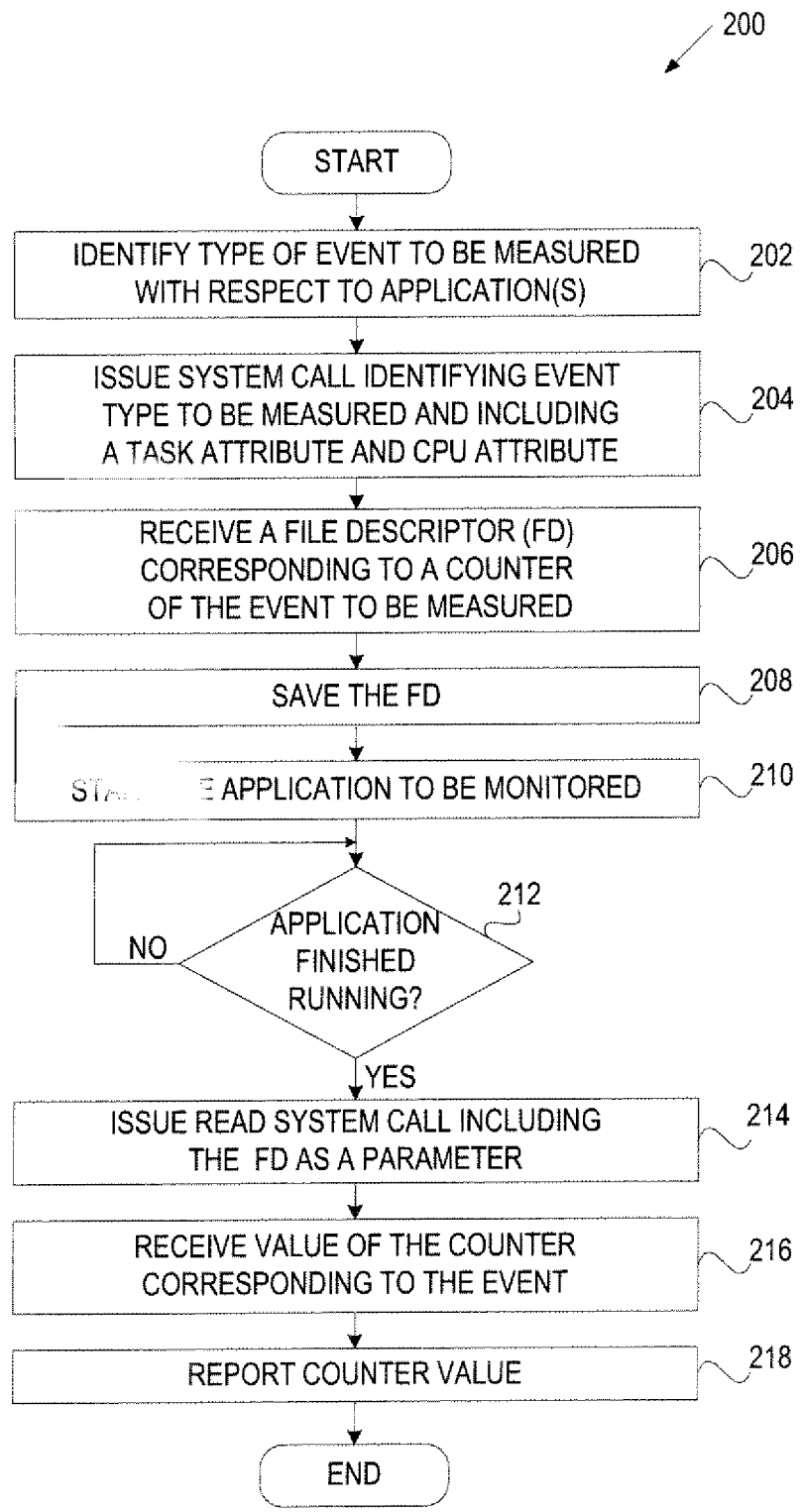
FIG. 2 is a flow diagram of one embodiment of a method for obtaining performance data for different performance events via a unified channel.

FIG. 2 is a flow diagram of one embodiment of a method 200 for obtaining performance data for different performance events via a unified channel. The method 200 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 200 is performed by a monitoring application (e.g., monitoring application 104 of FIG. 1A).

Referring to FIG. 2, method 200 begins with identifying the type of an event to be measured with respect to one or more monitored applications (block 202). The event may be a hardware event or a software event, and event types may include, for example, cache accesses, cache misses, branch instructions, mis-predicted branches, CPU cycles, CPU clocks, task clocks, page faults, context switches, CPU migration, fault alignments, fault emulations, etc. The monitoring application may identify the type of the event based on user input. In one embodiment, neither the user nor the monitoring application needs to be aware of whether the event is a software or hardware event. Alternatively, the monitoring application or the user needs to know whether the event is a software or hardware event.

At block 204, processing logic issues a system call including a generalized event type as a parameter. For example, the CPU cycles event can have an identifier of 0, the instructions event can have an identifier of 1, the cache references event can have an identifier of 2, the cache misses event can have an identifier of 3, the branch instructions event can have an identifier of 4, the mis-predicted branches event may have an identifier of 5, the bus cycles event may have an identifier of 6, the CPU clock event may have an identifier of −1, the task clock event may have an identifier of −2, the page fault event may have an identifier of −3, the context switch event may have an identifier of −4, the CPU migration event may have an identifier of −5, the fault alignment event may have an identifier of −6, the fault emulation event may have an identifier of −7, etc. If the CPE subsystem is unable to count the selected event, then the system call will return an invalid code message.

If the monitoring application desires to measure a hardware event that does not have a generalized identifier, the monitoring application can request a counter for such an event by including the precise ("raw") event code (e.g., "0x4064") as the event type parameter in the system call and including an indicator which specifies that the event type parameter has the raw event code as opposed to a generalized event type ID.

In one embodiment, the issue call may also include a counter parameter that specifies whether a requested counter is a "counting" counter that counts the number of occurring events or a "sampling" counter that collects sampling information at certain time intervals. The counter parameter may specify a sampling time interval which will be equal to 0 if the counter is a counting counter or will be greater than 0 if the counter is a sampling counter. For a sampling counter, a record type parameter may be included in the system call to specify what sampling data should be recorded at each time interval. This data may be recorded to a ring-buffer that is available to the user space.

In one embodiment, the system call includes a task id (pid) as a parameter, which allows the counter to be specific to a task. For example, if the pid parameter is zero, the counter is attached to the current task. If the pid parameter is greater than zero, the counter is attached to a specific task (if the current task has sufficient privilege to do so). If the pid parameter is less than zero, then all tasks should be counted (per cpu counters).

In one embodiment, the system call includes a CPU id (cpu) as a parameter, which allows a counter to be made specific to a CPU. For example, if the cpu parameter is equal to or greater than zero, the counter is restricted to a specific CPU. If the cpu parameter is equal to a negative number, then the counter should count on all CPUs. According to the above examples, if the pid parameter is greater than zero and the cpu parameter equals to a negative number, then the counter should be a per task counter that counts events of that task and "follows" that task to whatever CPU the task gets scheduled to. Per task counters can be created by any user, for their own tasks. If the pid parameter is equal to −1 and the cpu parameter is equal to x, then the counter should be a per CPU counter that counts all events on CPU-x. Such a counter may need an administrator privilege to be provided.

In one embodiment, the system call includes a counter group parameter that allows counters to be grouped when created. In one embodiment, a counter group has one counter which is the group "leader". The leader is created first (e.g., with the group parameter equal to −1) and the rest of the group members are created subsequently (e.g., with the group parameter equal to the identifier, such as a file descriptor, of the group leader). A single counter may be considered to be a group with only one member. A counter group may be scheduled onto the CPU as a unit, that is, it may only be put onto the CPU if all of the counters in the group can be put onto the CPU. This means that the values of the member counters can be meaningfully compared, added, divided (to get ratios), etc. with each other, since they have counted events for the same set of executed instructions.

In one embodiment, the system call includes a counter inheritance parameter to request the counter to count events on descendant tasks as well as the task specified. In one embodiment, this only applies to new descendant tasks, not to any existing descendant tasks at the time the counter is created (nor to any new descendant tasks of existing descendant tasks).

At block 206, processing logic receives a file descriptor (FD) corresponding to a counter of the event to be measured. At block 208, processing logic saves the FD.

Subsequent operation of the monitoring application depends on whether the requested counter is a counting counter or a sampling counter. The following description of FIG. 2 illustrate one embodiment concerning a counting counter. Embodiments pertaining to a sampling counter will be discussed in more detail below in conjunction with FIGS. 7A through 7E.

At block 210, processing logic starts the application to be monitored. At block 212, processing logic determines whether the application finished running. If not, processing block waits until the execution of the application is completed. When the execution of the application is completed, processing logic issues a read system call including the FD as a parameter (block 214). At block 216, processing logic receives the value of the counter corresponding to the FD. At block 218, processing logic reports the counter value. Further, processing logic issues a close FD system call that causes the counter to be deactivated.

As discussed above, multiple counters can be open at a time, and the counters can be polled using a poll system call specifying relevant FDs. For example, a user may request the monitoring application to collect performance statistics of a web browser session (e.g., via a command such as "$ perf stat firefox"). The user may then initiate a web browser session, browse the Internet, and then exit the web browser. An example of the resulting performance counter statistics may be as follows:

| | | | |
|---|---|---|---|
| 124.774572 | task-clock-msecs | 0.042 | CPUs |
| 5810 | context-switches | 0.047 | M/sec |
| 30 | CPU-migrations | 0.000 | M/sec |
| 13146 | page-faults | 0.105 | M/sec |
| 284647077 | Cycles | 2281.291 | M/sec |
| 149399264 | Instructions | 0.525 | IPC |
| 10214781 | Cache references | 81.866 | M/sec |
| 173344 | Cache misses | 1.389 | M/sec |
| 2.939191909 | seconds time elapsed | | |

In this example, four separate software counters were started: for the task clock event, the context switch event, the CPU migration event, and the page fault event; and four separate hardware counters were started: for the cycles event, the instructions event, the cache-references event, and the cache-misses event. The 'perf stat' monitoring application received eight separate file descriptors (FDs) from the kernel, e.g., FD 10, 11, 12, 13, 14, 15, 16 and 17. For example, the line "149399264 Instructions 0.525 IPC" was printed after reading from the sixth FD (value 15). The read( ) system call returned the value 149399264.

Performance statistics such as those illustrated above can be generated after the execution of a monitored application is completed or after a user stops a session of an application or a task specified in the request (initial system call) of the monitoring application.

Figure 3:
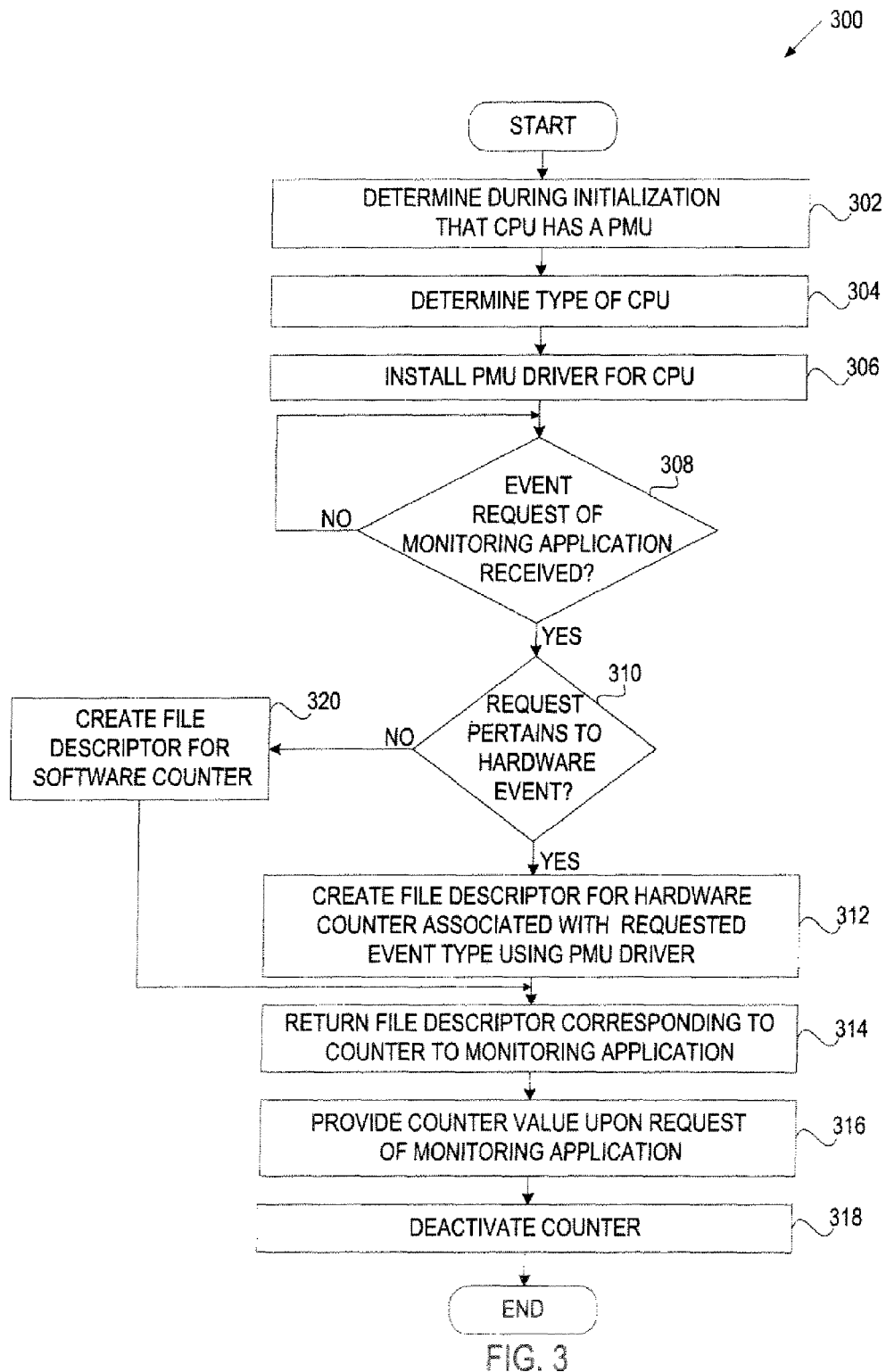
FIG. 3 is a flow diagram of one embodiment of a method for handling performance counters and events.

FIG. 3 is a flow diagram of one embodiment of a method 300 for handling performance counters and events. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a kernel (e.g., kernel PCE subsystem 106 of FIG. 1A).

Referring to FIG. 3, method 300 begins with determining, during initialization of the operating system, that each CPU has a PMU. At block 304, processing logic determines the type of each CPU. At block 306, processing logic installs a PMU driver for each CPU.

Subsequently, processing logic waits for an event request of a monitoring application (block 308). Upon receiving the request of the monitoring application (e.g., via a system call), processing logic determines whether the event type pertains to a hardware event (block 310). If not (i.e., the event type pertains to a software event), processing logic activates a software counter for the requested event type, invokes an appropriate routine to measure the requested event type, creates a file descriptor for the software counter (block 320), and proceeds to block 314.

If the event type pertains to a hardware event, processing logic uses the PMU driver to activates a hardware counter for the requested event type, and creates a file descriptor corresponding to the for hardware counter (block 312). At block 314, processing logic returns the file descriptor corresponding to the counter to the monitoring application. At block. 316, upon a request of the monitoring application (e.g., via a read FD system call), processing logic provides the counter value to the monitoring application. At block 318, processing logic deactivates the counter.

Figure 4A:
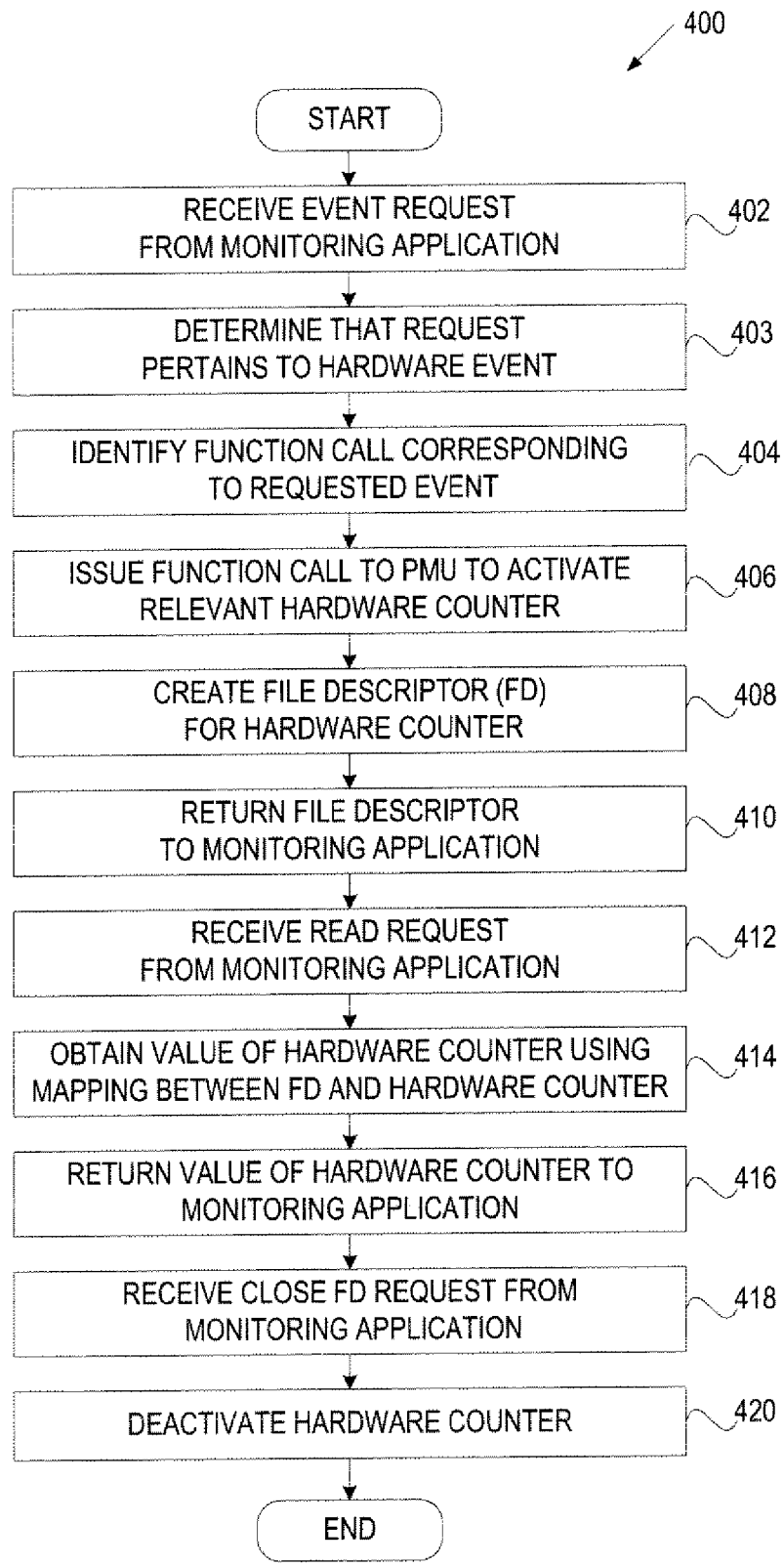
FIG. 4A is a flow diagram of one embodiment of a method for providing an abstraction of hardware counters.

FIG. 4A is a flow diagram of one embodiment of a method 400 for providing an abstraction of hardware counters. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a kernel (e.g., kernel PCE subsystem 106 of FIG. 1A).

Referring to FIG. 4A, method 400 begins with receiving an event request from a monitoring application (block 402). At block 403, processing logic determines the request pertains to a hardware event. At block 404, processing logic identifies a function call corresponding to the requested event. At block 406, processing logic issues the function call to the PMU to activate a relevant hardware counter. At block 408, processing logic creates a file descriptor (FD) for the hardware counter. At block 410, processing logic returns the file descriptor to the monitoring application.

At block 412, processing logic receives a read request from the monitoring application specifying the file descriptor. At block 414, processing logic obtains the value of the hardware counter using the mapping between the file descriptor and the hardware counter. At block 416, processing logic returns the value of the hardware counter to the monitoring application.

At block 418, processing logic receives a close file descriptor request from the monitoring application. At block 420, processing logic deactivates the hardware counter.

Figure 4B:
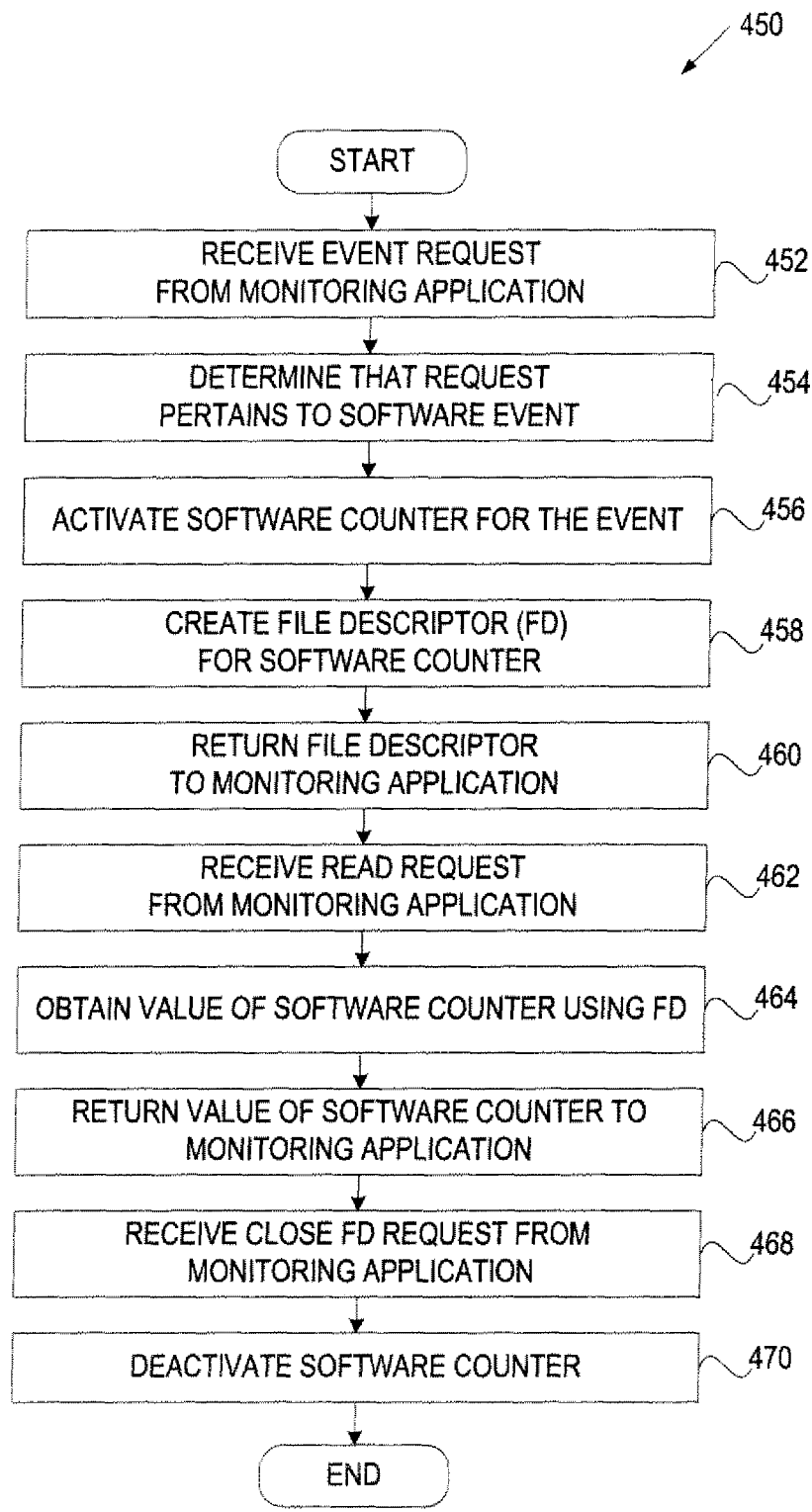
FIG. 4B is a flow diagram of one embodiment of a method for providing software counters.

FIG. 4B is a flow diagram of one embodiment of a method 450 for providing software counters. The method 450 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 450 is performed by a kernel (e.g., kernel PCE subsystem 106 of FIG. 1A).

Referring to FIG. 4B, method 450 begins with receiving an event request from a monitoring application (block 452). At block 454, processing logic determines that the request pertains to a software event. At block 456, processing logic activates a software counter for the event. The software counter may be a designated field in an existing data structure or a newly allocated field in a data structure. Processing logic may then invoke an appropriate software event routine to measure the requested event. At block 458, processing logic creates a file descriptor (FD) for the software counter. At block 460, processing logic returns the file descriptor to the monitoring application.

At block 462, processing logic receives a read request from the monitoring application specifying the file descriptor. At block 464, processing logic obtains the value of the software counter using the file descriptor. At block 466, processing logic returns the value of the software counter to the monitoring application.

At block 468, processing logic receives a close file descriptor request from the monitoring application. At block 470, processing logic deactivates the software counter.

Figure 5:
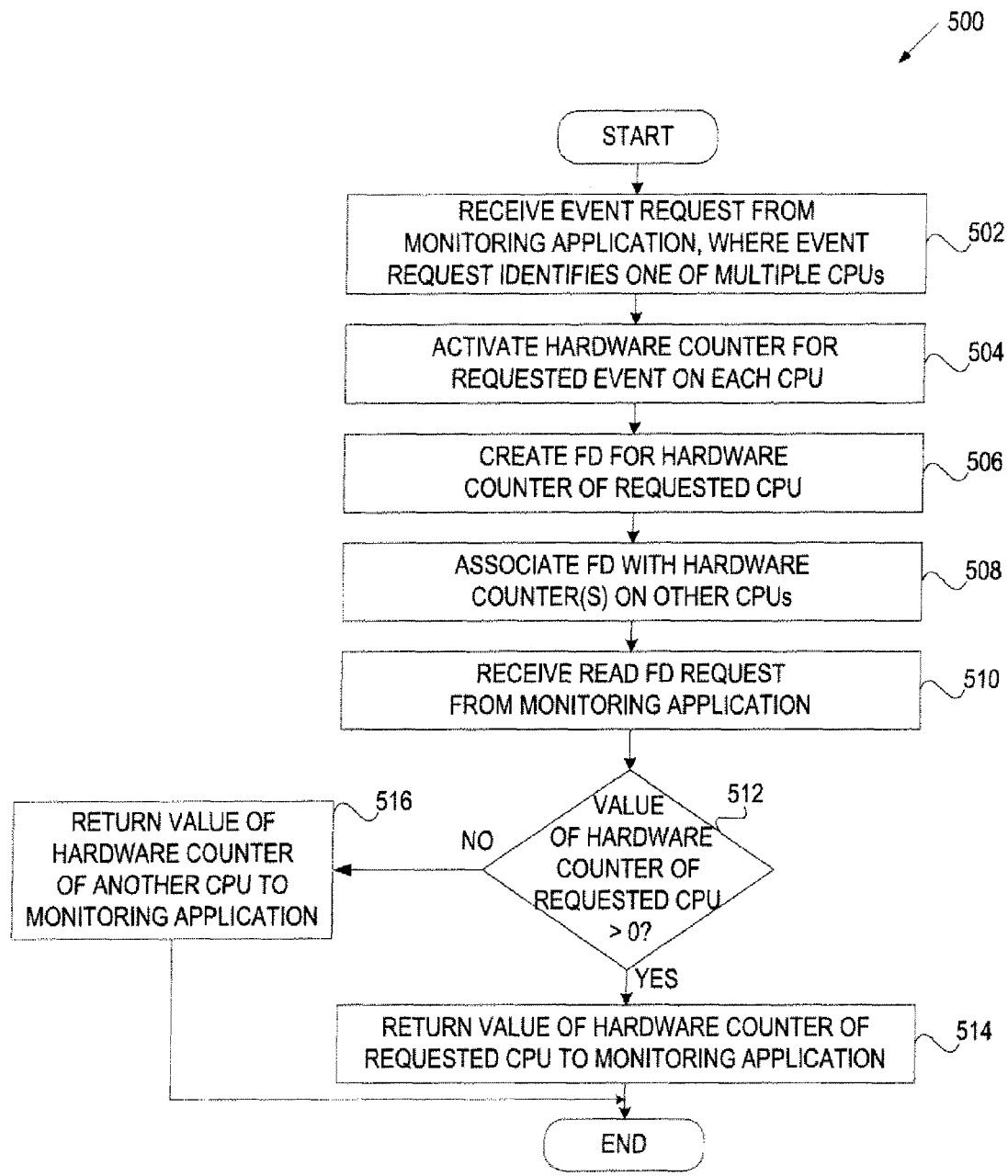
FIG. 5 is a flow diagram of one embodiment of a method for providing hardware counters in a system having multiple CPUs.

FIG. 5 is a flow diagram of one embodiment of a method 500 for providing hardware counters in a system having multiple CPUs. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by a kernel (e.g., kernel PCE subsystem 106 of FIG. 1A).

Referring to FIG. 5, method 500 begins with receiving an event request of a monitoring application. The event request identifies one of multiple CPUs to restrict a hardware counter to a specific CPU. At block 504, processing logic activates a hardware counter for the requested event on each CPU to cover a possibly mistaken id of the CPU. At block 506, processing logic creates a file descriptor (FD) for a hardware counter of the requested CPU. At block 508, processing logic associates the FD with the hardware counter(s) on the other CPU(s).

At block 510, processing logic receives a read FD request from the monitoring application. At block 512, processing logic determines whether the value of the hardware counter of the requested CPU is greater than 0. If so, processing logic returns the value of the hardware counter of the requested CPU to the monitoring application (block 514). If not, processing logic selects the CPU that has the hardware counter greater than zero and returns the value of this hardware counter to the monitoring application (block 516).

Alternatively, if the initial request of the monitoring application asks for counting on all CPUs, processing logic activates a hardware counter for the requested event on each CPU, allocates a data field for a cumulative counter, and creates a file descriptor (FD) for the cumulative counter. Upon receiving a read FD request from the monitoring application, processing logic adds the values of all hardware counters to the cumulative counter, and provides the resulting cumulative counter value to the monitoring application.

Figure 6A:
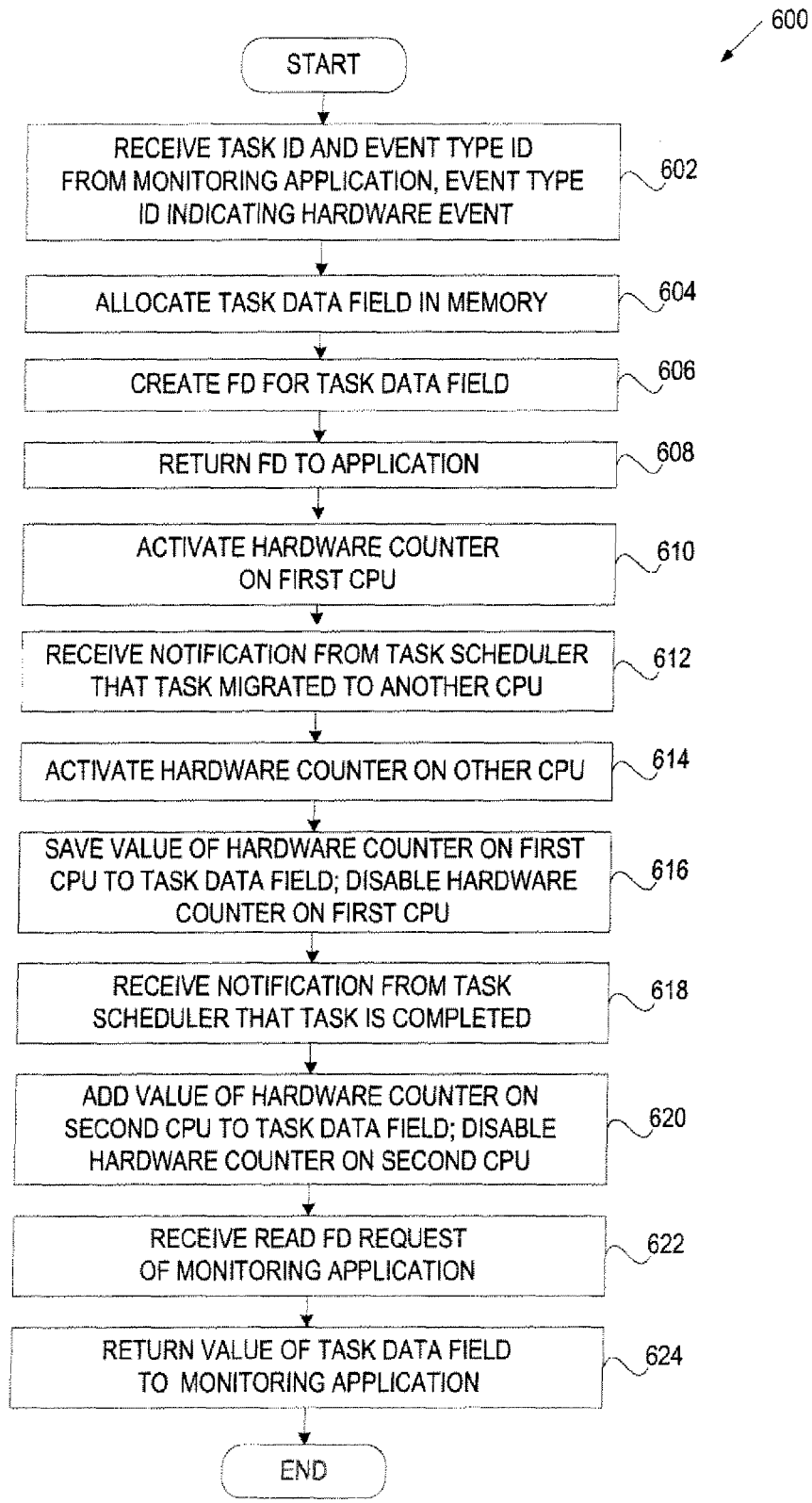
FIG. 6A is a flow diagram of one embodiment of a method for providing a hardware counter for a specific task in a system having multiple CPUs.

FIG. 6A is a flow diagram of one embodiment of a method 600 for providing a hardware counter for a specific task in a system having multiple CPUs. The method 600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 600 is performed by a kernel (e.g., kernel PCE subsystem 106 of FIG. 1A).

Referring to FIG. 6A, method 600 begins with receiving an event request of a monitoring application with an event type ID, a task ID and a CPU parameter indicating that the task should be monitored on all CPUs (block 602). The event type ID indicates that the event is a hardware event.

At block 604, processing logic allocates a task data field in memory. At block 606, processing logic creates an FD for the task data field. At block 608, processing logic returns the FD to the monitoring application.

At block 610, processing logic receives a notification from a CPU scheduler of the kernel that the task has begun executing on a first CPU and activates a hardware counter on the first CPU. At block 612, processing logic receives a notification from the kernel's task scheduler that the task has migrated to another CPU. At block 614, processing logic activates the hardware counter on the second CPU. At block 616, processing logic saves the value of the hardware counter of the first CPU to the task data field and disables the hardware counter on the first CPU.

At block 618, processing logic receives a notification from the task scheduler that the task is complete. At block 620, processing logic adds value of the hardware counter on the second CPU to the task data field, and disables the hardware counter on the second CPU. At block 622, processing logic receives a read FD request of the monitoring application. At block 624, processing logic returns the value of the task data field to monitoring application.

In another embodiment, the specified task is executed on a single CPU but the CPU switches between the specified task (task-B) and another task (task-A), with task-B having a single counter (it opened a single FD via the system call) and task-B having no counters. In this embodiment, when the CPU switches from task-A to task-B, the PCE subsystem receives a notification from the CPU scheduler and activates a hardware counter corresponding to the FD. Task-B executes its timeslice for x milliseconds. Then, the CPU scheduler switches task-A in. The PCE subsystem detects the switch and deactivates the hardware counter corresponding to the FD. Task-A executes its timeslice for y milliseconds, after which the CPU scheduler switches task-B back in. The PCE subsystem detects the switch and activates the hardware counter corresponding to the FD. Task-B executes its timeslice for z milliseconds.

In the above example, the hardware counter of the CPU was enabled for x milliseconds, then it was disabled for y milliseconds, and then it was enabled again for z milliseconds. In one embodiment, the PCE subsystem allocates a data structure with counter objects that are active for any given task, and the kernel's task scheduler enables/disables the right counter object(s) for each task as the CPU switches between tasks. That is, a counter object keeps in ticking when its task runs, and does not change when its task does not run. The resulting cumulative value of the counter object corresponding to the FD is provided to the monitoring application when requested.

Figure 6B:
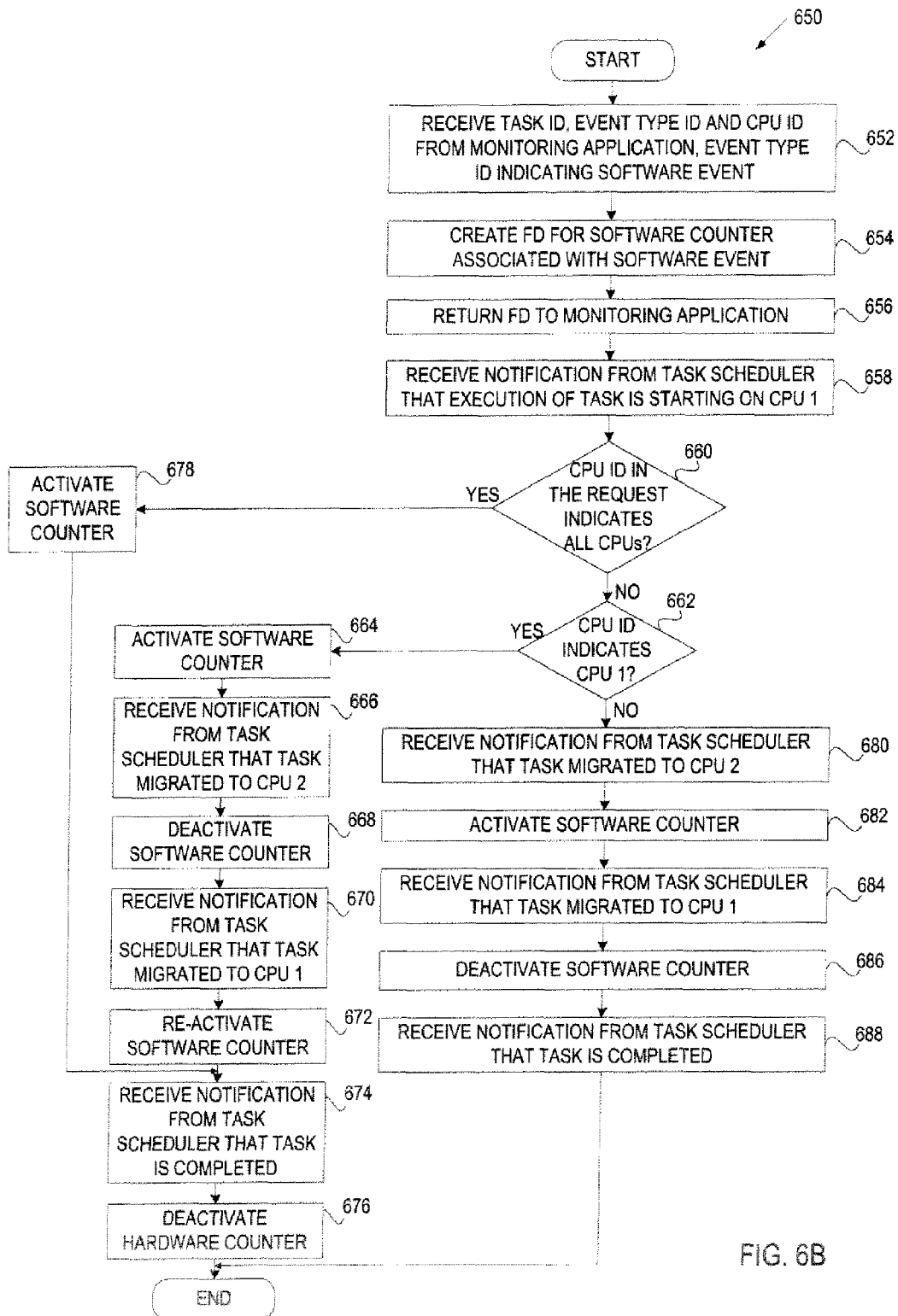
FIG. 6B is a flow diagram of one embodiment of a method for providing a software counter for a specific task in a system having multiple CPUs.

FIG. 6B is a flow diagram of one embodiment of a method 650 for providing a software hardware counter for a specific task in a system having multiple CPUs. The method 650 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 650 is performed by a kernel (e.g., kernel PCE subsystem 106 of FIG. 1A).

Referring to FIG. 6B, method 650 begins with receiving an event request of a monitoring application with an event type ID, a task ID and a CPU parameter (block 652). The event type ID indicates that the event is a software event.

At block 654, processing logic activates a software counter for the software event and creates a file descriptor (FD) for the software counter associated with the software event. At block 656, processing logic returns the FD to the monitoring application. At block 658, processing logic receives a notification from the task scheduler that the execution of the task is starting at CPU 1.

At block 660, processing logic determines whether the CPU ID in the request indicates all CPUs. If so, processing logic activates the software counter (block 678) and proceeds to block 674, causing the counter to be incremented while the task executes, regardless of whether the task executes on a single CPU or migrates between different CPUs.

Alternatively, if the CPU ID in the request indicates CPU1 (block 662), processing logic activates the software counter (block 664). At block 666, processing logic receives a notification from the task scheduler that the task is migrating to CPU 2. At block 668, processing logic deactivates the software counter. At block 670, processing logic receives a notification from the task scheduler that the task is migrating to CPU 1. In response, at block 672, processing logic re-activates the software counter. At block 674, processing logic receives a notification from the task scheduler that the task is complete. At block. 676, processing logic deactivates the hardware counter.

If the CPU ID in the request indicates CPU 2, processing logic does not activate a software counter until it receives a notification from the task scheduler that the task is migrating to CPU 2 (block 680). At block 682, processing logic activates the software counter. At block 684, processing logic receives a notification from the task scheduler that the task is migrating to CPU 1. In response, at block 686, processing logic deactivates the software counter. At block 688, processing logic receives a notification from the task scheduler that the task is completed, causing method 650 to end.

Figure 7A:
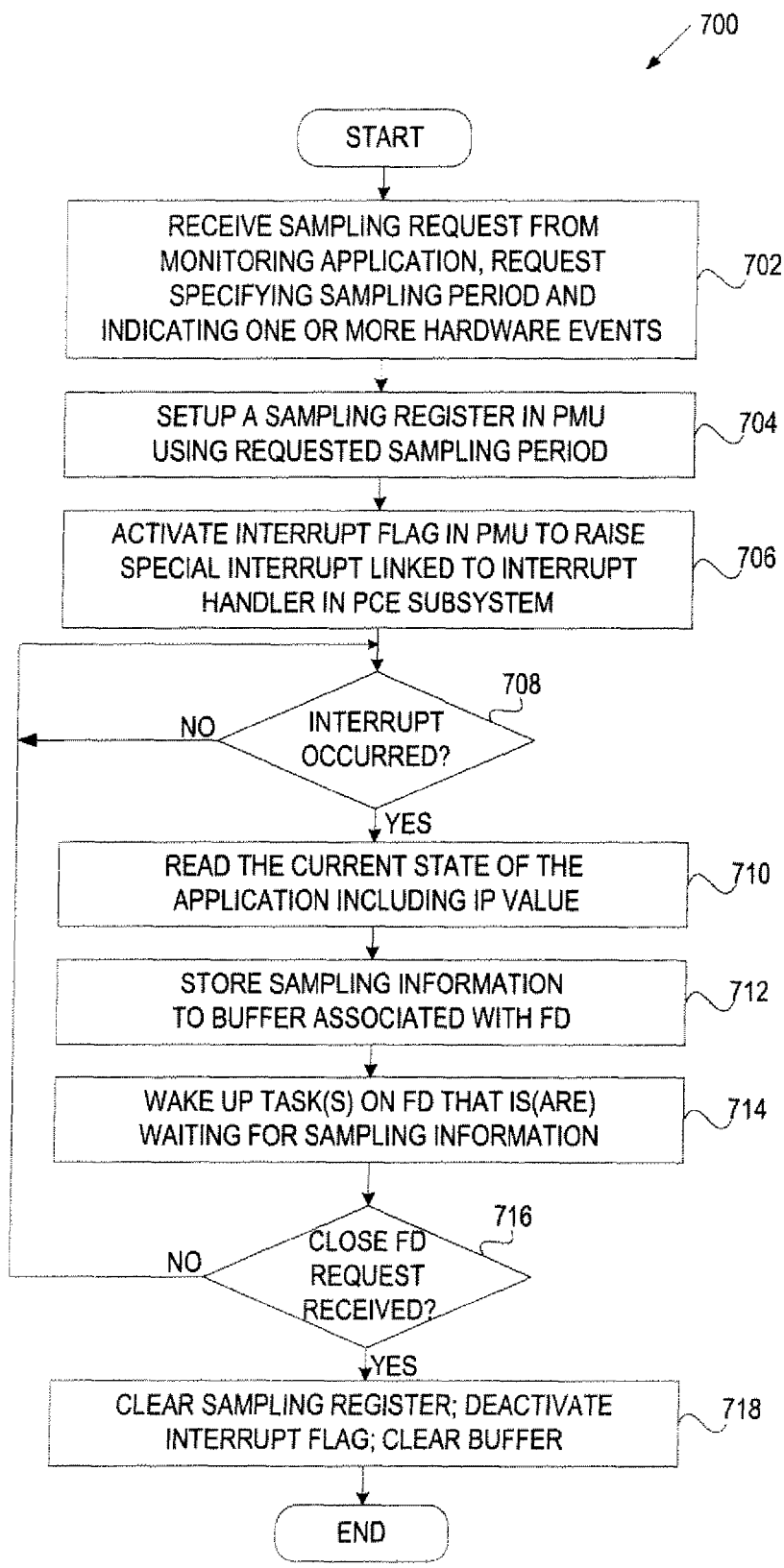
FIG. 7A is a flow diagram of one embodiment of a method for providing hardware event sampling information to a monitoring application.

FIG. 7A is a flow diagram of one embodiment of a method 700 for providing hardware event sampling information to a monitoring application. The method 700 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 700 is performed by a kernel (e.g., kernel PCE subsystem 106 of FIG. 1A).

Referring to FIG. 7A, method 700 begins with receiving a sampling request of a monitoring application, where the sampling request specifies a sampling time period and indicates one or more hardware events (block 702). The sampling request may indicate one or more hardware events by specifying ID(s) of the hardware event type(s). Alternatively, a specific hardware event may be a default event when the sampling request does not include any event type IDs. The sampling request may ask for monitoring of all programs running on the system or of a specific program or task identified in the request. The request of the monitoring application may be issued before or after the execution of the monitored application(s) begins.

At block 704, processing logic sets up a sampling register in the PMU using a requested sampling period. At block 706, processing logic activates an interrupt flag in the PMU to raise a special interrupt linked to an interrupt handler in the PCE subsystem. Processing logic then allocates a buffer, associates an FD with the buffer, and returns the FD to the monitoring application.

At block 708, processing logic determines whether an interrupt has occurred. If not, processing logic waits for the interrupt. Is so, processing logic reads the current state of the application, including an instruction pointer (IP) value (block 710). At block 712, processing logic stores resulting sampling information to the buffer associated with the FD. At block 714, processing logic wakes up task(s) on the FD that is(are) waiting for sampling information. At block 716, processing logic determines whether the closed FD request has been received. If not, processing logic returns to block 708. If so, processing logic clears the sampling register, deactivates the interrupt flag and clears the buffer.

Figure 7B:
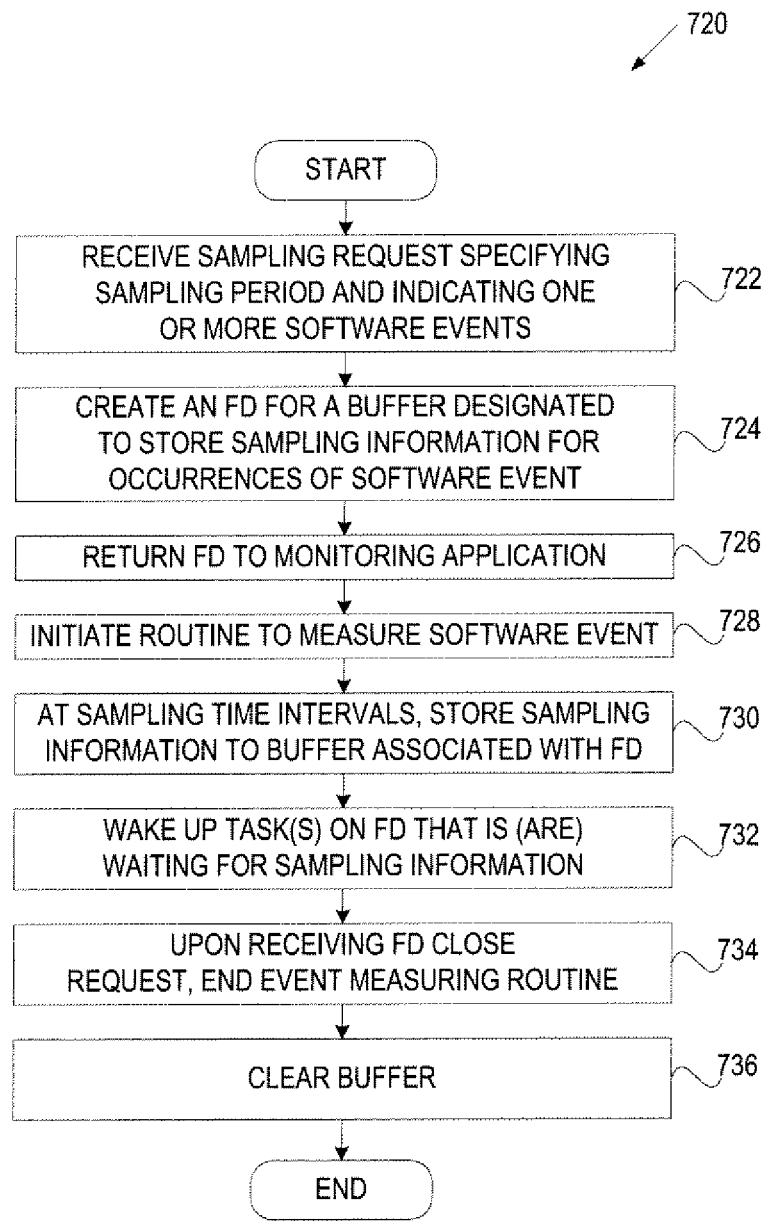
FIG. 7B is a flow diagram of one embodiment of a method for providing software event sampling information to a monitoring application.

FIG. 7B is a flow diagram of one embodiment of a method 720 for providing software event sampling information to a monitoring application. The method 720 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 720 is performed by a kernel (e.g., kernel PCE subsystem 106 of FIG. 1A).

Referring to FIG. 7B, method 720 begins with with receiving a sampling request of a monitoring application, where the sampling request specifies a sampling time interval and indicates one or more software events (block 722). The sampling request may indicate one or more software events by specifying ID(s) of the software event type(s). Alternatively, a specific software event may be a default event when the sampling request does not include any event type IDs.

At block 724, processing logic creates an FD for a buffer designated to store sampling information for occurrences of the software event. At block 726, processing logic returns the FD to the monitoring application. At block 728, processing logic initiates a routine to provide sampling information pertaining to the software event. For example, for the CPU clock event or the task clock event, a relevant routine sets timer interrupts at sampling time intervals. A timer interrupt causes sampling information (an instruction pointer (IP) value) to be recorded to the buffer associated with the FD. For the page fault event, a page fault handler causes sampling information to be recorded to the buffer when a page fault occurs.

At sampling time intervals, processing logic stores sampling information to the buffer associated with the FD (block 730). The sampling information includes an IP value that indicates where the program is executing when the event being measured is detected. At block 732, processing logic wakes up task(s) on the FD that is (are) waiting for sampling information.

Upon receiving an FD close request from the monitoring application, processing logic terminates the routine measuring the software event (block 734) and clears the buffer (block 736).

Figure 7C:
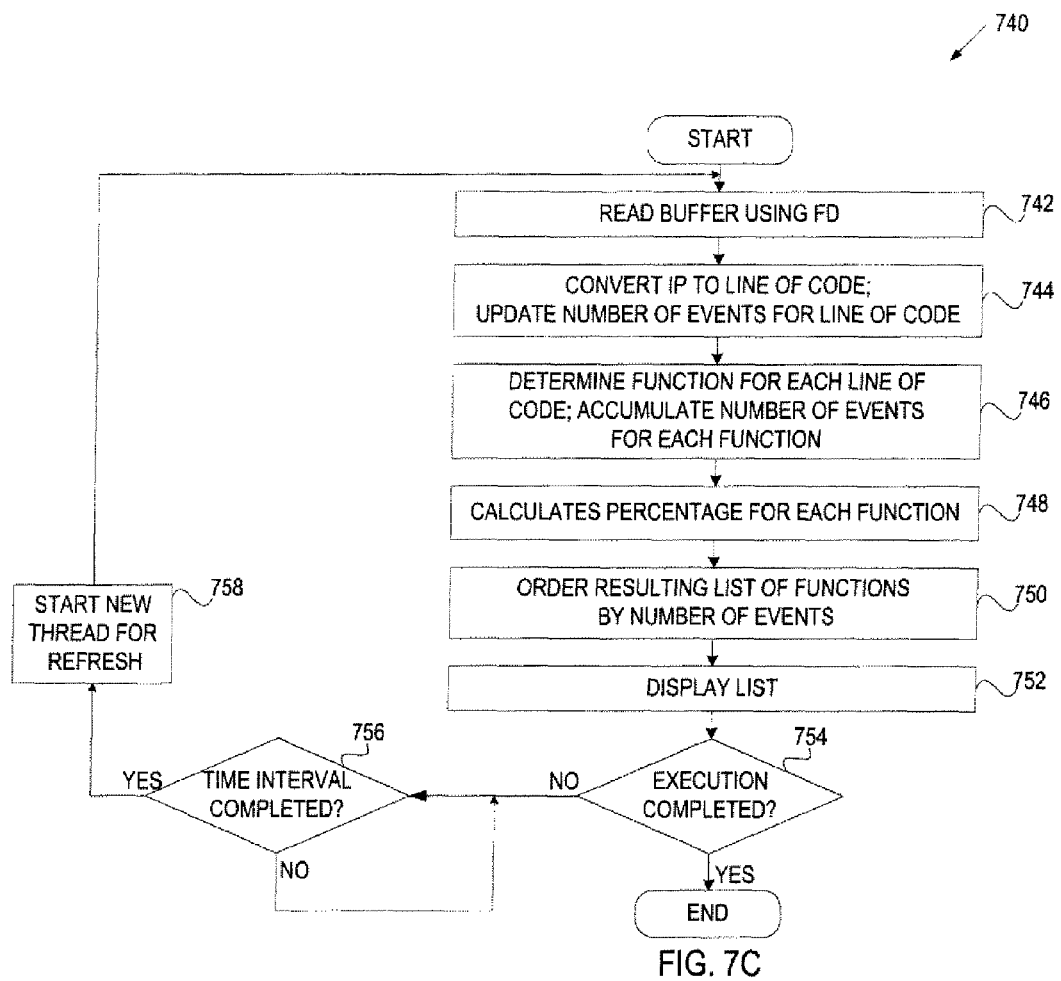
FIG. 7C is a flow diagram of one embodiment of a method for presenting performance statistics of applications in real time.

FIG. 7C is a flow diagram of one embodiment of a method 740 for presenting performance statistics of an application in real time. The method 740 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 740 is performed by a monitoring application (e.g., monitoring application 104 of FIG. 1A).

Referring to FIG. 7C, method 740 executes every N seconds (e.g., every 1 or 2 seconds). At block 742, processing logic reads current sampling information from a buffer (e.g., ring buffer) using an FD provided by the kernel PCE subsystem in response to an initial system call issued by the monitoring application. The initial system call can be issued when a user enters, in the command line, the identifier of the monitoring application. The user may also enter the identifiers of the event type(s) to be measured and other parameters discussed above.

In one embodiment, processing logic uses the mmap system call to read the sampling information from the buffer. Processing logic may process everything that is included in the buffer, and when the buffer is empty, processing logic may wait for a certain time period (e.g., 100 milliseconds) and then try again.

At block 744, processing logic converts each IP read from the buffer to a specific line of code and updates the number of events associated with this line of code. At block 746, processing logic determines a relevant function for each line of code and accumulates the number of events for each function. An exemplary embodiment of a method for mapping an IP to a line of code and determining a relevant function for the line of code will be discussed in more detail below in conjunction with FIG. 7D.

At block 748, processing logic calculates the percentage for each function. The percentage indicates what portion of the total number of samples belongs to a function. At block 750, processing logic sorts the resulting list of functions by the number of events in ascending order. At block 752, processing logic displays the ordered list of functions to the user.

Next, if the execution of the monitored program (or in some embodiments of at least one of the monitored programs) continues (block 754), processing logic waits for a sampling time interval (e.g., 2 seconds) (block 756), and starts a new thread to refresh the displayed information by repeating operations performed at blocks 742 through 752. Hence, as the monitored application(s) continue(s) execution, method 740 immediately (in real time) displays changes in the performance of the monitored application(s) with respect to the requested event(s).

Figure 7D:
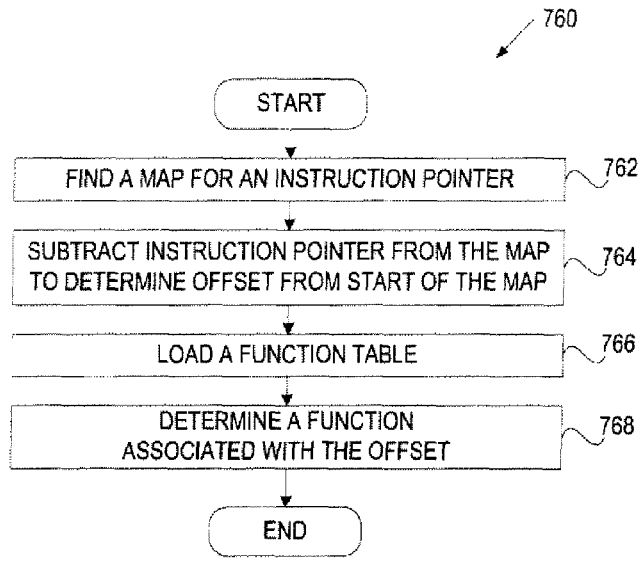
FIG. 7D is a flow diagram of one embodiment of a method for mapping an instruction pointer to a function.

FIG. 7D is a flow diagram of one embodiment of a method 760 for mapping an instruction pointer to a function. The method 760 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 760 is performed by a monitoring application (e.g., monitoring application 104 of FIG. 1A).

Referring to FIG. 7D, the kernel generates events (e.g., events of type PERF_EVENT_MMAP) when a binary file of an application is loaded, stating where the binary image on the disk is being mapped in memory and for what thread. When receiving a sample event, processing logic finds a map to which an IP associated with the sample event belongs (block 762). At block 764, processing logic subtracts the IP from the map to determine the offset from the start of this map.

At block 766, processing logic processes the binary file to find a function table and loads the function table into memory. At block 768, processing logic searches the function table for a function to which the offset belongs.

Figure 7E:
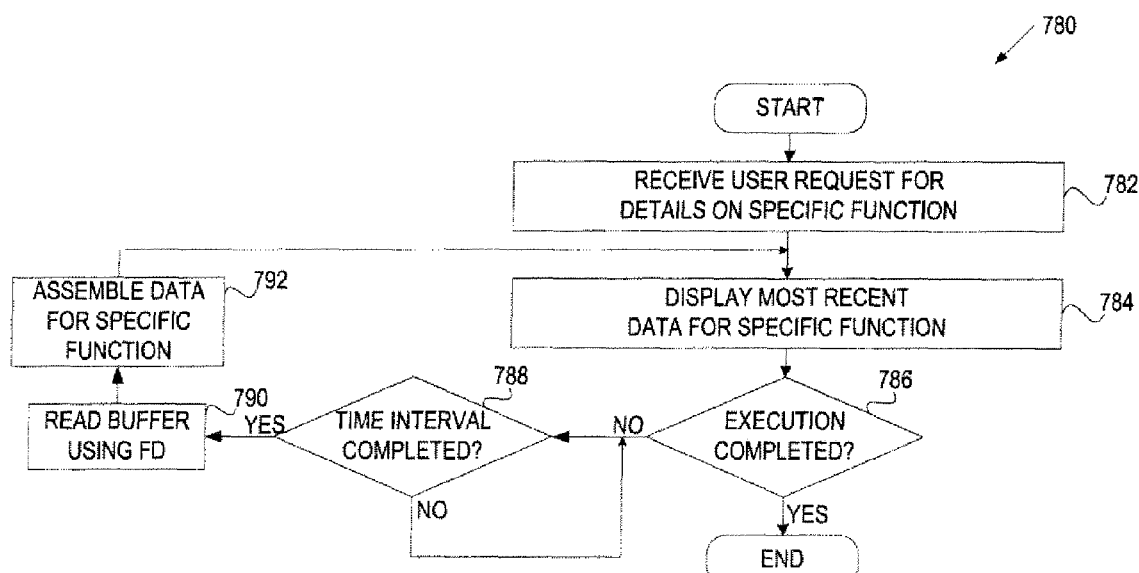
FIG. 7E is a flow diagram of one embodiment of a method for presenting performance details for a specific function in real time.

FIG. 7E is a flow diagram of one embodiment of a method 780 for presenting performance details for a specific function in real time. The method 780 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 780 is performed by a monitoring application (e.g., monitoring application 104 of FIG. 1A).

Referring to FIG. 7E, method 780 begins when a user views the list of functions generated by method 740 of FIG. 7C and submits a request to view details of a specific function selected from the list. At block 782, processing logic receives a user request for details pertaining to the specific function. At block 784, processing logic displays most recent data captured for the specific function. This data includes lines of code from the specific function and the number of events occurred when this line of code was executing, as discussed above in conjunction with FIG. 7C (e.g., blocks 744 and 746).

Next, if the execution of the monitored program(s) continue(s) (block 786), processing logic waits for a certain time interval (block 788), and then refreshes details for the specified function by reading the ring buffer again (block 790), mapping IPs to lines of code and functions and assembling data pertaining to the lines of code within the specified function (block 792), and then returning to block 784 to update the screen with this data (block 784).

An example of a profile output presented by monitoring application PerfTop (e.g., by executing method 740 of FIG. 7C) is provided as follows:

| PerfTop: 68 irqs/sec kernel: 92.6% [1000 Hz cycles], (all, 2 CPUs) | | | |
| --- | --- | --- | --- |
| Samples | pcnt | function | DSO |
| 800 | 32.90% | read_hpet | /lib/modules/2.6.32-rc5/build/vmlinux |
| 232 | 9.50% | _spin_lock_irqsave | /lib/modules/2.6.32-rc5/build/vmlinux |

-continued

| | | PerfTop: 68 irqs/sec kernel: 92.6% [1000 Hz cycles], (all, 2 CPUs) | |
|---|---|---|---|
| Samples | pcnt | function | DSO |
| 113 | 4.60% | acpi_os_read_port | /lib/modules/2.6.32-rc5/build/vmlinux |
| 107 | 4.40% | hpet_next_event | /lib/modules/2.6.32-rc5/build/vmlinux |
| 57.00 | 2.30% | trace_hardirqs_off | /lib/modules/2.6.32-rc5/build/vmlinux |
| 43.00 | 1.80% | _spin_lock | /lib/modules/2.6.32-rc5/build/vmlinux |
| 37.00 | 1.50% | _spin_unlock_irqrestore | /lib/modules/2.6.32-rc5/build/vmlinux |
| 34.00 | 1.40% | n_tty_write | /lib/modules/2.6.32-rc5/build/vmlinux |
| 34.00 | 1.40% | native_read_tsc | /lib/modules/2.6.32-rc5/build/vmlinux |
| 30.00 | 1.20% | schedule | /lib/modules/2.6.32-rc5/build/vmlinux |
| 28.00 | 1.20% | acpi_idle_enter_bm | /lib/modules/2.6.32-rc5/build/vmlinux |
| 25.00 | 1.00% | sched_clock_local | /lib/modules/2.6.32-rc5/build/vmlinux |
| 22.00 | 0.90% | _IO_vfprintf_internal | /lib64/libc-2.10.1.so |
| 21.00 | 0.90% | _spin_lock_irq | /lib/modules/2.6.32-rc5/build/vmlinux |
| 20.00 | 0.80% | system_call | /lib/modules/2.6.32-rc5/build/vmlinux |
| 19.00 | 0.80% | _might_sleep | /lib/modules/2.6.32-rc5/build/vmlinux |
| 19.00 | 0.80% | trace_hardirqs_on | /lib/modules/2.6.32-rc5/build/vmlinux |
| 17.00 | 0.70% | tick_broadcast_oneshot_control | /lib/modules/2.6.32-rc5/build/vmlinux |
| 16.00 | 0.70% | native_apic_mem_write | /lib/modules/2.6.32-rc5/build/vmlinux |
| 15.00 | 0.60% | leave_mm | /lib/modules/2.6.32-rc5/build/vmlinux |
| 15.00 | 0.60% | __pthread_mutex_lock_internal | /lib64/libpthread-2.10.1.so |
| 14.00 | 0.60% | kmem_cache_alloc | /lib/modules/2.6.32-rc5/build/vmlinux |
| 14.00 | 0.60% | _IO_new_file_xsputn | /lib64/libc-2.10.1.so |
| 14.00 | 0.60% | half_md4_transform | /lib/modules/2.6.32-rc5/build/vmlinux |
| 14.00 | 0.60% | copy_user_generic_string | /lib/modules/2.6.32-rc5/build/vmlinux |
| 13.00 | 0.50% | find_busiest_group | /lib/modules/2.6.32-rc5/build/vmlinux |
| 12.00 | 0.50% | _GI_mbrtowc | /lib64/libc-2.10.1.so |
| 11.00 | 0.50% | tty_insert_flip_string | /lib/modules/2.6.32-rc5/build/vmlinux |
| 11.00 | 0.50% | str2hashbuf_signed | /lib/modules/2.6.32-rc5/build/vmlinux |
| 11.00 | 0.50% | __switch_to | /lib/modules/2.6.32-rc5/build/vmlinux |
| 11.00 | 0.50% | _link_path_walk | /lib/modules/2.6.32-rc5/build/vmlinux |
| 11.00 | 0.50% | _gconv_transform_utf8_internal | /lib64/libc-2.10.1.so |
| 10.00 | 0.40% | sched_clock_cpu | /lib/modules/2.6.32-rc5/build/vmlinux |
| 10.00 | 0.40% | tick_nohz_stop_sched_tick | /lib/modules/2.6.32-rc5/build/vmlinux |
| 10.00 | 0.40% | menu_select | /lib/modules/2.6.32-rc5/build/vmlinux |
| 10.00 | 0.40% | _atomic_dec_and_lock | /lib/modules/2.6.32-rc5/build/vmlinux |
| 10.00 | 0.40% | native_sched_clock | /lib/modules/2.6.32-rc5/build/vmlinux |
| 10.00 | 0.40% | select_task_rq_fair | /lib/modules/2.6.32-rc5/build/vmlinux |
| 10.00 | 0.40% | irq_entries_start | /lib/modules/2.6.32-rc5/build/vmlinux |
| 9.00 | 0.40% | __kmalloc | /lib/modules/2.6.32-rc5/build/vmlinux |
| 9.00 | 0.40% | _int_malloc | /lib64/libc-2.10.1.so |
| 8.00 | 0.30% | rb_insert_color | /lib/modules/2.6.32-rc5/build/vmlinux |
| 8.00 | 0.30% | enqueue_hrtimer | /lib/modules/2.6.32-rc5/build/vmlinux |
| 8.00 | 0.30% | _int_free | /lib64/libc-2.10.1.so |
| 8.00 | 0.30% | do_select | /lib/modules/2.6.32-rc5/build/vmlinux |
| 8.00 | 0.30% | _cond_resched | /lib/modules/2.6.32-rc5/build/vmlinux |
| 7.00 | 0.30% | cpuidle_idle_call | /lib/modules/2.6.32-rc5/build/vmlinux |

In the above example, "cycles" were sampled with the result of 68 samples per seconds. High-overhead functions are shown at the top of this histogram, indicating the "hot spots" of execution. The list is updated in real time providing the most current changes in the performance of the monitored applications.

When a user requests details for function "hpet_next_event" specified in row 4 of the above list, the following data is displayed:

| | PerfTop: 616 irqs/sec kernel: 89.1% [1000 Hz cycles], (all, 2 CPUs) | |
|---|---|---|
| | Showing cycles for hpet_next_event | |
| Events | Pcnt (>=5%) | |
| 0 | 0.00% | cnt = hpet_readl(HPET_COUNTER); |
| 0 | 0.00% | cnt += (u32) delta; |
| 0 | 0.00% | hpet_writel(cnt, HPET_Tn_CMP(timer)); |
| 48 | 43.60% | ffffffff81036526:    c1 e2 05          shl $0x5,%edx |
| 0 | 0.00% | * counter. |
| 0 | 0.00% | */ |
| 0 | 0.00% | WARN_ON_ONCE((u32)hpet_readl(HPET_Tn_CMP(timer)) != cnt); |
| 37 | 33.60% | ffffffff81036549:    39 d8             cmp %ebx,%eax |
| 0 | 0.0% | ffffffff81036578:    8b 80 f0 00 00 00 mov 0xf0(%rax),%eax |
| 0 | 0.00% | |
| 0 | 0.0% | return (s32)((u32)hpet_readl(HPET_COUNTER) − cnt) >= 0 ? −ETIME : 0; |
| 25 | 22.70% | ffffffff8103657e:    29 d8             sub %ebx,%eax |

In the above example, "cycles" sampled for function "hpet_next_event" with the result of 616 samples per seconds. The data is updated in real time providing the most current details for the function.

Figure 8:
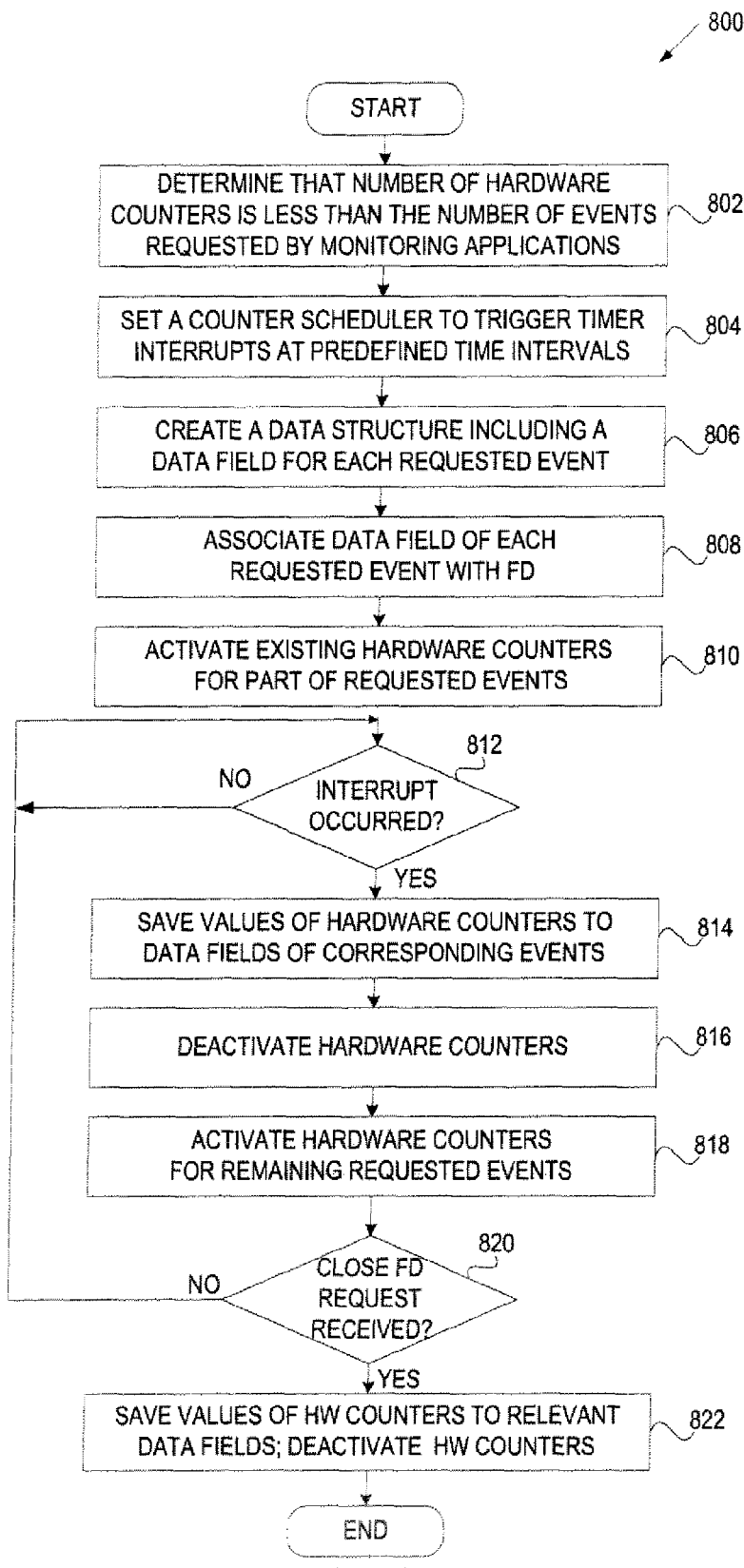
FIG. 8 is a flow diagram of one embodiment of a method for imitating an unlimited number of hardware counters.

FIG. 8 is a flow diagram of one embodiment of a method 800 for imitating an unlimited number of hardware counters. The method 800 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 800 is performed by a kernel (e.g., kernel PCE subsystem 106 of FIG. 1A).

Referring to FIG. 8, method 800 begins with determining that the number of hardware counters is less than the number of events requested by the monitoring application (block 802). At block 804, processing logic sets a counter scheduler to trigger timer interrupts at predefined time intervals. At block 806, processing logic creates a data structure including a data field for each requested event. At block 808, processing logic associates a data field of each requested event with an FD. At block 810, processing logic activates existing hardware counters for part of the requested events.

At block 812, processing logic determines whether an interrupt has occurred. If not, processing logic waits for the interrupt. Is so, processing logic saves the value of the hardware counters to corresponding data fields (block 814). At block 816, processing logic deactivates the hardware counters. At block 818, processing logic activates hardware counters for the remaining requested events. At block 820, processing logic determines whether a close FD request has been received. If not, processing logic returns to block 812. If so, processing logic saves the value of the hardware counters to corresponding data fields, deactivates the counter scheduler and deactivates the hardware counters.

Figure 9:
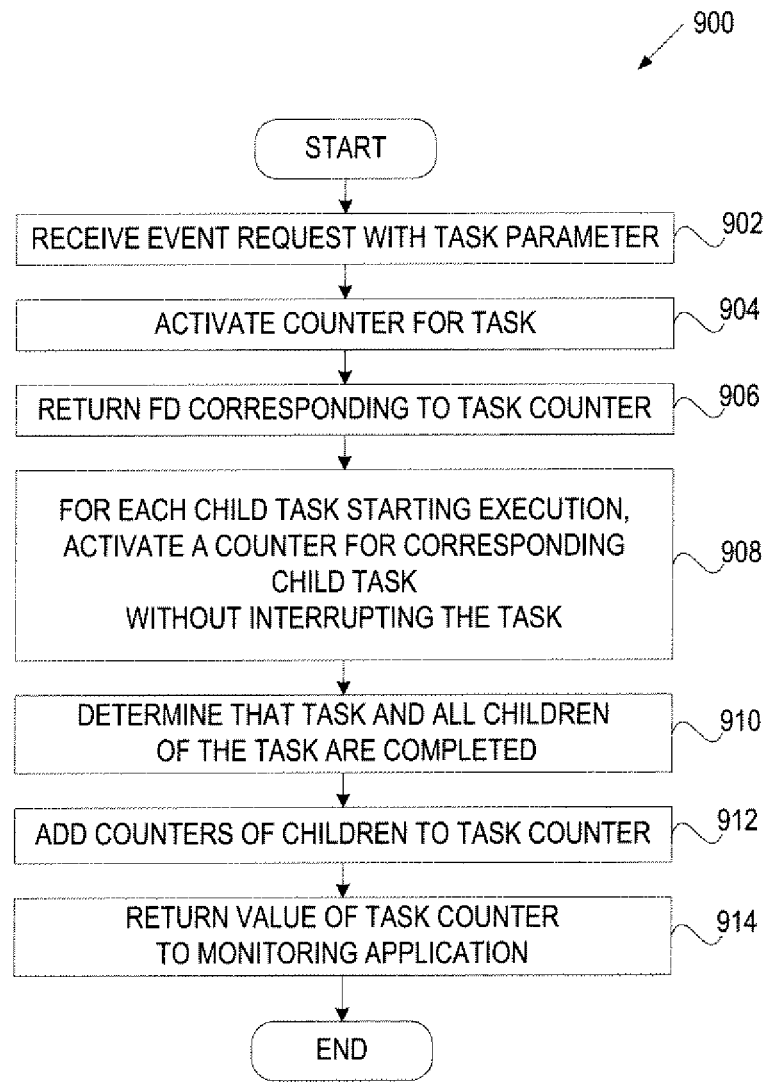
FIG. 9 is a flow diagram of one embodiment of a method for providing performance counter inheritance.

FIG. 9 is a flow diagram of one embodiment of a method 900 for providing performance counter inheritance. The method 900 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 900 is performed by a kernel (e.g., kernel PCE subsystem 106 of FIG. 1A).

Referring to FIG. 9, method 900 begins with receiving an event request with a task parameter from a monitoring application (block 902). The request may pertain to a hardware event or a software event. The task parameter may specify a particular task. The request may also include a processor parameter that may specify a particular CPU or cover all CPUs. In one embodiment, the request includes an inheritance indicator that requires all children of the task to be measured along with the specified task.

At block 904, processing logic activates a counter for a task. If the requested event is a hardware event, processing logic activates a hardware counter as discussed in more detail above. If the requested event is a software event, processing logic activates a software counter as discussed in more detail above. At block 906, processing logic returns an FD corresponding to the task counter to the monitoring application.

Processing logic receives a notification from a task scheduler each time a child of the task begins execution. A child task may be executing on the same thread as the task or on a sub-thread. For each child task, upon receiving the above notification from the task scheduler, processing logic activates a counter for a corresponding child of the task without interrupting the task and other children of the task. If the requested event is a hardware event, processing logic activates a hardware counter for each child task. If the requested event is a software event, processing logic activates a software counter for each child task. If the processor parameter specifies all CPUs, processing logic follows the task and each child of the task to all CPUs to which they migrate, without deactivating their counters. If the processor parameter specifies a particular CPU, processing logic ensures that corresponding counters are activated when the task and/or children of the task migrate to the specified CPU, are deactivated when they migrate to a different CPU, and are re-activated when they return to the specified CPU.

When the execution of the task or any child of the task is completed, processing logic deactivates the task counter or a corresponding child task counter. When the execution of the task and each child of the task is completed (block 910) (e.g., the task counter and each child task counter are deactivated), processing logic adds counter values of all children of the task to the counter of the task (block 912).

At block 914, processing logic returns the resulting value of the task counter to the monitoring application. Processing logic may return the resulting value upon receiving a request of the monitoring application specifying the FD of the task counter.

In some embodiments, if the initial request of the monitoring application includes the task parameter specifying all tasks, processing logic activates a counter for each task and extends a task counter to cover all children of this task In addition, any hierarchy of tasks can be monitored using method 900, extending a counter of each task in the hierarchy to all children of this task.

Figure 10:
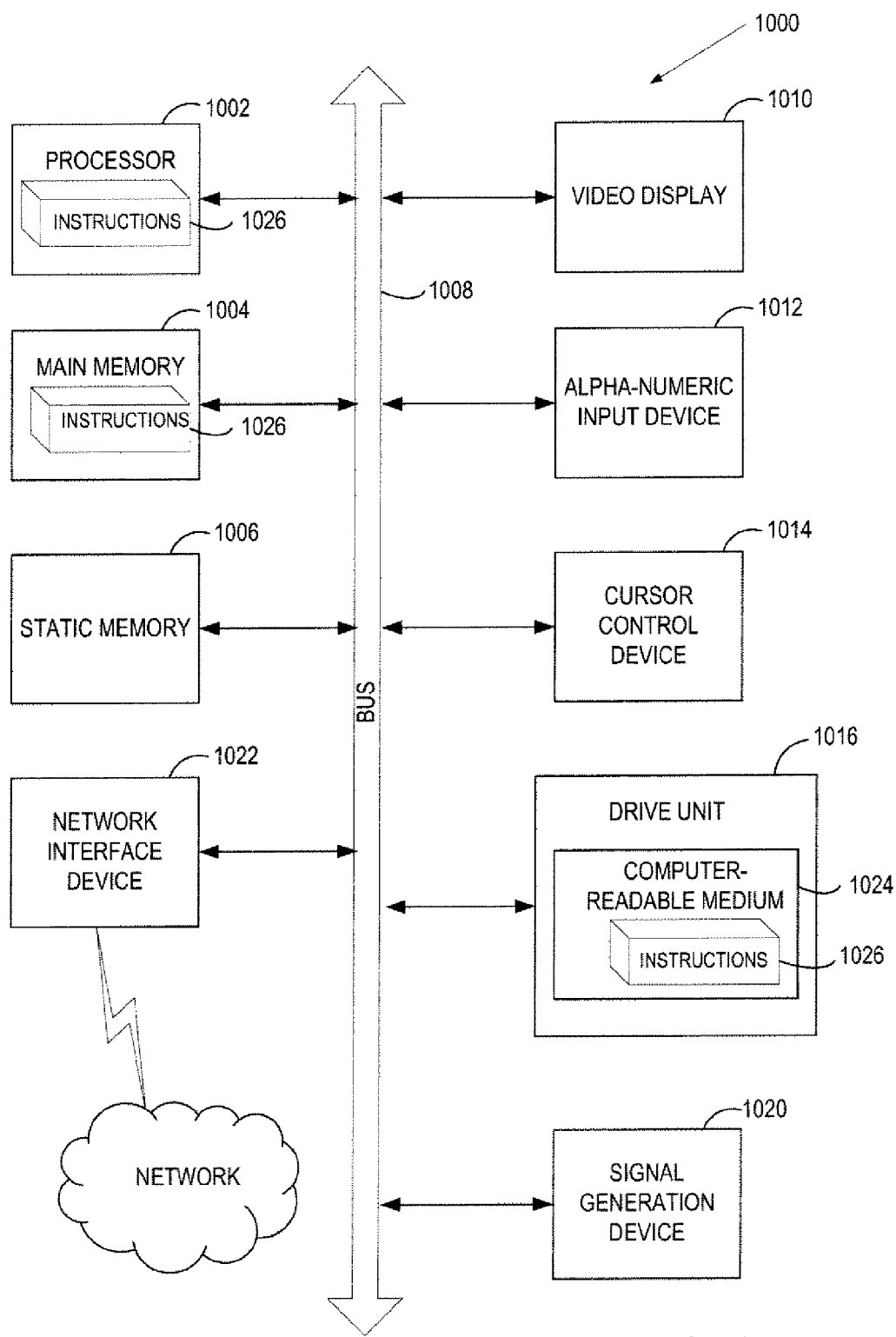
FIG. 10 is a block diagram of one embodiment of a computing system monitoring application performance.

FIG. 10 is a block diagram of one embodiment of a computing system monitoring application performance. Within the computing system 1000 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computing system 1000 includes one or more processing devices 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1016 (e.g., a data storage device in the form of a drive unit, which may include fixed or removable computer-readable storage medium), which communicate with each other via a bus 1008.

Processing devices 1002 represent one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute instructions 1026 (e.g., PCE subsystem 106 and/or profiler 112 of FIG. 1A) for performing the operations and steps discussed herein.

The computer system 1000 may further include a network device 110 (e.g., NIC, Ethernet network card, etc.). The computer system 1000 also may include a video display unit 1010 (e.g., a liquid crystal display (LCD) or a cathode ray tube (CRT)) connected to the computer system through a graphics port and graphics chipset, an alphanumeric input device 1012 (e.g., a keyboard), a cursor control device 1014 (e.g., a mouse), and a signal generation device 1020 (e.g., a speaker).

The secondary memory 1016 may include a machine-readable storage medium (or more specifically a computer-readable storage medium) 1024 on which is stored one or more sets of instructions (e.g., PCE subsystem 106 and/or profiler 112 of FIG. 1A) embodying any one or more of the methodologies or functions described herein. The instructions 1026 (e.g., PCE subsystem 106 and/or profiler 112 of FIG. 1A) may also reside, completely or at least partially, within the main memory 1004 and/or within the processing device 1002 during execution thereof by the computer system 1000, the main memory 1004 and the processing device 1002 also constituting machine-readable storage media. The instructions 1026 (e.g., PCE subsystem 106 and/or profiler 112 of FIG. 1A) may further be transmitted or received over a network 1018 via the network device 110.

The computer-readable storage medium 1024 may also be used to store the instructions 1026 (e.g., PCE subsystem 106 and/or profiler 112 of FIG. 1A) persistently. While the computer-readable storage medium 1026 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features described herein (for example in relation to FIG. 1A) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "creating," "returning," "providing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for providing performance statistics of applications in real time has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system, comprising:
   issuing, by a first application executing on the computing system, a request for performance data of at least one second application to an operating system executing on the computing system, the request indicating one or more events to be monitored during execution of the second application, wherein the first application and the second application are running on top of the operating system;
   receiving, by the first application, one or more file descriptors for the events;
   obtaining, by the first application and during execution of the second application, current performance data of the second application using the file descriptors;
   utilizing, by the first application, the current performance data to determine, during execution of the second application, a list of functions performed by the second application and a number of events occurred during execution of each function in the list of functions;
   presenting, by the first application, resulting data to a user of the computing system, the resulting data comprising the list of functions and corresponding numbers of events; and
   periodically refreshing, by a processing device executing the first application and during execution of the second application, the presented data using up-to-date performance data of the second application, wherein the up-to-date performance data of the second application is obtained by the first application while the first application and the second application are running on top of the operating system.

2. The method of claim 1 wherein:
   the events include any one of a software event or a hardware event;
   the hardware event is any one of a CPU cycle, a code instruction, a cache reference, a cache miss, a cache reference, a branch instruction, a branch miss, or a bus cycle; and
   the software event is any one of a CPU clock, a task clock, a page fault, a context switch, a CPU migration, a fault alignment, or a fault emulation.

3. The method of claim 1 further comprising:
   using the file descriptor to access a buffer that stores the current performance data.

4. The method of claim 1 wherein the performance data comprises a current instruction pointer.

5. The method of claim 4 wherein utilizing, by the first application, the current performance data to determine a list of functions and a number of events occurred during execution of each function comprises:
   converting the current instruction pointer to a line of code;
   incrementing a counter for the line of code;
   determining a function for each line of code; and
   accumulating a number of events associated with each function.

6. The method of claim 5 wherein presenting, by the first application, resulting data to a user comprises:
   calculating an event percentage of each function over events of all functions in the list of functions; and
   sorting the list of functions by the number of events in ascending order.

7. The method of claim 1 wherein the presented data is refreshed at a specific time interval, the time interval being predefined or specified in the request.

8. The method of claim 1 wherein:
   the request includes at least one of a task parameter indicator or a processor parameter;
   the task parameter indicates any one of a current task, a specific task, or all tasks executed on a processor; and
   the processor parameter indicates any one of a specific processor, or all processors on the computing system.

9. The method of claim 1 further comprising:
   while presenting the resulting data to the user, receiving a user request for details with respect to a function selected from the list; and
   displaying most recent data for the selected function.

10. The method of claim 9 further comprising:
    periodically refreshing the displayed data for the selected function based on up-to-date performance data.

11. The method of claim 1 wherein the request includes a group parameter that allows multiple events to be combined into a group.

12. A system comprising:
    a memory;
    at least one processor, coupled to the memory;
    an operating system, executed from the memory by the processor; and
    a first application, executed from the memory by the processor, to
    issue a request for performance data of at least one second application executed by the processor to the operating system, the request indicating one or more events to be monitored during execution of the second application, wherein the first application and the second application are running on top of the operating system;
    receive one or more file descriptors for the events;
    obtain, during execution of the second application, current performance data of the second application using the file descriptors;
    determine, based on the current performance data and during execution of the second application, a list of functions performed by the second application and a number of events occurred during execution of each function in the list of functions;
    present resulting data to a user, the resulting data comprising the list of functions and corresponding numbers of events; and
    periodically refresh, during execution of the second application, the presented data using up-to-date performance data of the second application, wherein the up-to-date performance data of the second application is obtained by the first application while the first application and the second application are running on top of the operating system.

13. The system of claim 12 wherein:
    the events include any one of a software event or a hardware event;
    the hardware event is any one of a CPU cycle, a code instruction, a cache reference, a cache miss, a cache reference, a branch instruction, a branch miss, or a bus cycle; and the software event is any one of a CPU clock, a task clock, a page fault, a context switch, a CPU migration, a fault alignment, or a fault emulation.

14. The system of claim 12 wherein the performance data comprises a current instruction pointer.

15. The system of claim 14 wherein the first application is to determine a list of functions and a number of events occurred during execution of each function by:
    converting the current instruction pointer to a line of code;
    incrementing a counter for the line of code;
    determining a function for each line of code; and
    accumulating a number of events associated with each function.

16. The system of claim 12 wherein the presented data is refreshed at a specific time interval, the time interval being predefined or specified in the request.

17. The system of claim 12 wherein:
    the request includes at least one of a task parameter indicator or a processor parameter;
    the task parameter indicates any one of a current task, a specific task, or all tasks executed on a processor; and
    the processor parameter indicates any one of a specific processor, or all processors on the computing system.

18. The system of claim 12 wherein the first application is further to:
    while presenting the resulting data to the user, receive a user request for details with respect to a function selected from the list;
    display most recent data for the selected function; and
    periodically refresh the displayed data for the selected function based on up-to-date performance data.

19. A non-transitory computer readable storage medium including instructions that, when executed by a computing system, cause the computing system to perform a method comprising:
    issuing, by a first application executing on the computing system, a request for performance data of at least one second application to an operating system executing on the computing system, the request indicating one or more events to be monitored during execution of the second application, wherein the first application and the second application are running on top of the operating system;
    receiving, by the first application, one or more file descriptors for the events;
    obtaining, by the first application and during execution of the second application, current performance data of the second application using the file descriptors;
    utilizing, by the first application, the current performance data to determine, during execution of the second application, a list of functions performed by the second application and a number of events occurred during execution of each function in the list of functions;
    presenting, by the first application, resulting data to a user of the computing system, the resulting data comprising the list of functions and corresponding numbers of events; and
    periodically refreshing, by a processing device executing the first application and during execution of the second application, the presented data using up-to-date performance data of the second application, wherein the up-to-date performance data of the second application is obtained by the first application while the first application and the second application are running on top of the operating system.

20. The computer readable storage medium of claim 19 wherein the performance data comprises a current instruction pointer.

21. The computer readable storage medium of claim 20 wherein utilizing, by the first application, the current performance data to determine a list of functions and a number of events occurred during execution of each function comprises:
    converting the current instruction pointer to a line of code;
    incrementing a counter for the line of code;
    determining a function for each line of code; and
    accumulating a number of events associated with each function.

22. The computer readable storage medium of claim 19 wherein the presented data is refreshed at a specific time interval, the time interval being predefined or specified in the request.

23. The computer readable storage medium of claim 19 wherein the method further comprises:
    while presenting the resulting data to the user, receiving a user request for details with respect to a function selected from the list;
    displaying most recent data for the selected function; and
    periodically refreshing the displayed data for the selected function based on up-to-date performance data.

* * * * *